US007414241B2

(12) United States Patent
Scott et al.

(10) Patent No.: US 7,414,241 B2
(45) Date of Patent: Aug. 19, 2008

(54) LASER DEVICE

(75) Inventors: Jill R. Scott, Idaho Falls, ID (US); Paul L. Tremblay, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 513 days.

(21) Appl. No.: 11/294,714

(22) Filed: Dec. 5, 2005

(65) Prior Publication Data

US 2006/0219895 A1 Oct. 5, 2006

Related U.S. Application Data

(63) Continuation-in-part of application No. 10/969,461, filed on Oct. 19, 2004, now Pat. No. 7,241,990, which is a continuation of application No. 10/003,905, filed on Nov. 1, 2001, now Pat. No. 6,822,228.

(51) Int. Cl.
*H01J 49/00* (2006.01)
*B01D 59/44* (2006.01)

(52) U.S. Cl. ........................ 250/288; 250/306; 173/105; 356/139; 356/141.1; 356/4.08

(58) Field of Classification Search ................. 250/288, 250/306; 73/105; 356/139, 141.1, 4.08, 356/123; 359/196, 831, 212–214, 220, 221, 359/223, 833–836; 372/24, 20, 99, 100
See application file for complete search history.

(56) References Cited

U.S. PATENT DOCUMENTS 5,852,493 A 12/1998 Monnin
5,861,550 A 1/1999 Ray
5,867,522 A 2/1999 Green et al.

OTHER PUBLICATIONS

Scott and Tremblay, "Highly reproducible laser beam scanning device for an internal source laser desorption microprobe Fourier transform mass spectrometer" Rev. Sci. Instrum. vol. 73, No. 3, Mar. 2002 pp. 1108-1116.*

Scott, J. R., et al, "Development of an Imaging Internal Laser Desorption Fourier Transform Mass Spectrometer," Pittsburg, PA Mar. 4-9, 2001, p. 143.

Tremblay, P. L., et al., "An Automated Imaging Internal Laser Desorption Fourier Transform Mass Spectrometer for Surface Analysis," 49th *ASMS Conference on Mass Spectrometry and Allied Topics*, Chicago, IL May 26-31, 2001.

Tremblay, P. L., et al, "Laser Scanning Design for a Fourier transform Mass Spectrometer," 48th ASMS Conference on Mass Spectrometry and Allied Topics, Long Beach, CA Jun. 11-15, 2000.

* cited by examiner

*Primary Examiner*—Jack I. Berman
*Assistant Examiner*—Michael Maskell
(74) *Attorney, Agent, or Firm*—Wells St. John

(57) ABSTRACT

A laser device includes a virtual source configured to aim laser energy that originates from a true source. The virtual source has a vertical rotational axis during vertical motion of the virtual source and the vertical axis passes through an exit point from which the laser energy emanates independent of virtual source position. The emanating laser energy is collinear with an orientation line. The laser device includes a virtual source manipulation mechanism that positions the virtual source. The manipulation mechanism has a center of lateral pivot approximately coincident with a lateral index and a center of vertical pivot approximately coincident with a vertical index. The vertical index and lateral index intersect at an index origin. The virtual source and manipulation mechanism auto align the orientation line through the index origin during virtual source motion.

27 Claims, 16 Drawing Sheets

LASER DEVICE

RELATED PATENT DATA

This patent is a continuation-in-part of U.S. patent application Ser. No. 10/969,461, filed Oct. 19, 2004, now U.S. Pat. No. 7,241,990, which resulted from a continuation application of Ser. No. 10/003,905, now U.S. Pat. No. 6,822,228, filed Nov. 1, 2001, which is herein incorporated by reference.

CONTRACTUAL ORIGIN OF THE INVENTION

The United States Government has certain rights in this invention pursuant to Contract No. DE-AC07-99ID13727, and Contract No. DE-AC07-05ID14517 between the United States Department of Energy and Battelle Energy Alliance, LLC.

TECHNICAL FIELD

The invention pertains to laser devices, including laser scanning devices and laser desorption spectrometers, as well as other devices.

BACKGROUND OF THE INVENTION

The use of lasers has become increasingly widespread. Lasers can be used for manufacture of products, material analysis, etc. Chemical imaging is one form of material analysis. Chemical imaging using mass spectrometry has attracted increasing interest because of numerous applications for characterizing materials science samples, biological tissues, individual aerosol particles, minerals, forensic evidence, etc. Chemical imaging is often based on secondary ion mass spectrometry (SIMS) by bombarding a surface with atomic primary beams to yield elemental secondary ions from a surface being analyzed. One disadvantage of such techniques includes surface charging that can lead to redeposition of material. Further, for SIMS, chemical imaging usually uses atomic ion primary beams that provide primarily elemental and not molecular chemical information.

Recently, laser desorption (LD) techniques for mass spectrometry have attracted attention because they produce intact molecular ions, avoid surface charging issues, and allow tuning of laser irradiation (wavelength and fluence) to accommodate various sample types. Careful control of laser fluence prevents excessive sputtering that can contaminate adjacent locations of a sample also intended for analysis.

Traditionally, LD microprobe mass spectrometers use scanning techniques that rely on manipulation of a sample target. Alternative LD techniques may accomplish manipulation by moving optical components. In such cases, spatial resolution (minimum controlled displacement of laser energy on the sample target) has been limited to mechanical resolution (minimum controlled displacement per step) of stepper or servo motors used to move the sample target or optical components. Such techniques often encounter problems with reproducible alignment of laser scans with sample targets. Often, such techniques are not easily amenable to analysis under extreme conditions including confined space, high magnetic fields, operation under vacuum, operation under high pressure, operation under hazardous conditions, etc.

SUMMARY OF THE INVENTION

In one aspect of the invention, a laser device includes a virtual source configured to aim laser energy that originates from a true source. The virtual source has a vertical rotational axis during vertical motion of the virtual source and the vertical axis passes through an exit point from which the laser energy emanates independent of virtual source position. The emanating laser energy is collinear with an orientation line. The laser device includes a virtual source manipulation mechanism that positions the virtual source. The manipulation mechanism has a center of lateral pivot approximately coincident with a lateral index and a center of vertical pivot approximately coincident with a vertical index. The vertical index and lateral index intersect at an index origin. The virtual source and manipulation mechanism auto align the orientation line through the index origin during virtual source motion.

BRIEF DESCRIPTION OF THE DRAWINGS

Preferred embodiments of the invention are described below with reference to the following accompanying drawings.

FIG. 14 is a side view of the laser device shown in FIG. 12 configured according to a different aspect of the invention.

DETAILED DESCRIPTION OF THE INVENTION

As may be perceived from the examples and exemplary embodiments described herein, some aspects of the present invention were derived from development of a laser desorption mass spectrometer. However, it will be apparent to those of ordinary skill that the several aspects of the invention can be applied in a variety of ways. For example, the aspects of the invention can also be used in fabrication of microelectronic, micromechanical, and similar devices, in recycling of precious materials by selective desorption, in spatial control of optically induced chemical processes, in steering a virtual laser energy source to aim and/or receive laser energy, etc. A variety of highly refined laser desorption techniques or applications are possible, including applications in the semiconductor industry for fabrication and quality control. For example, a laser desorption device as described herein could verify the location and composition of features on manufactured devices in context with a desired reference point. In each of the described applications, the aspects of the invention may be incorporated into a robotic system.

According to one aspect of the invention, a laser device includes a target position, an optical component separated a distance J from the target position, and a laser energy source separated a distance H from the optical component, distance H being greater than distance J. The laser device also includes a laser source manipulation mechanism exhibiting a mechanical resolution of positioning the laser source. The mechanical resolution can be less than a spatial resolution of laser energy at the target position as directed through the optical component. In the context of this document, the term "laser energy" is defined to include "laser beam" and/or "maser beam" as known to those skilled in the art as well as other forms of "laser energy" that may be consistent with the various aspects of the invention described herein.

Figure 1:
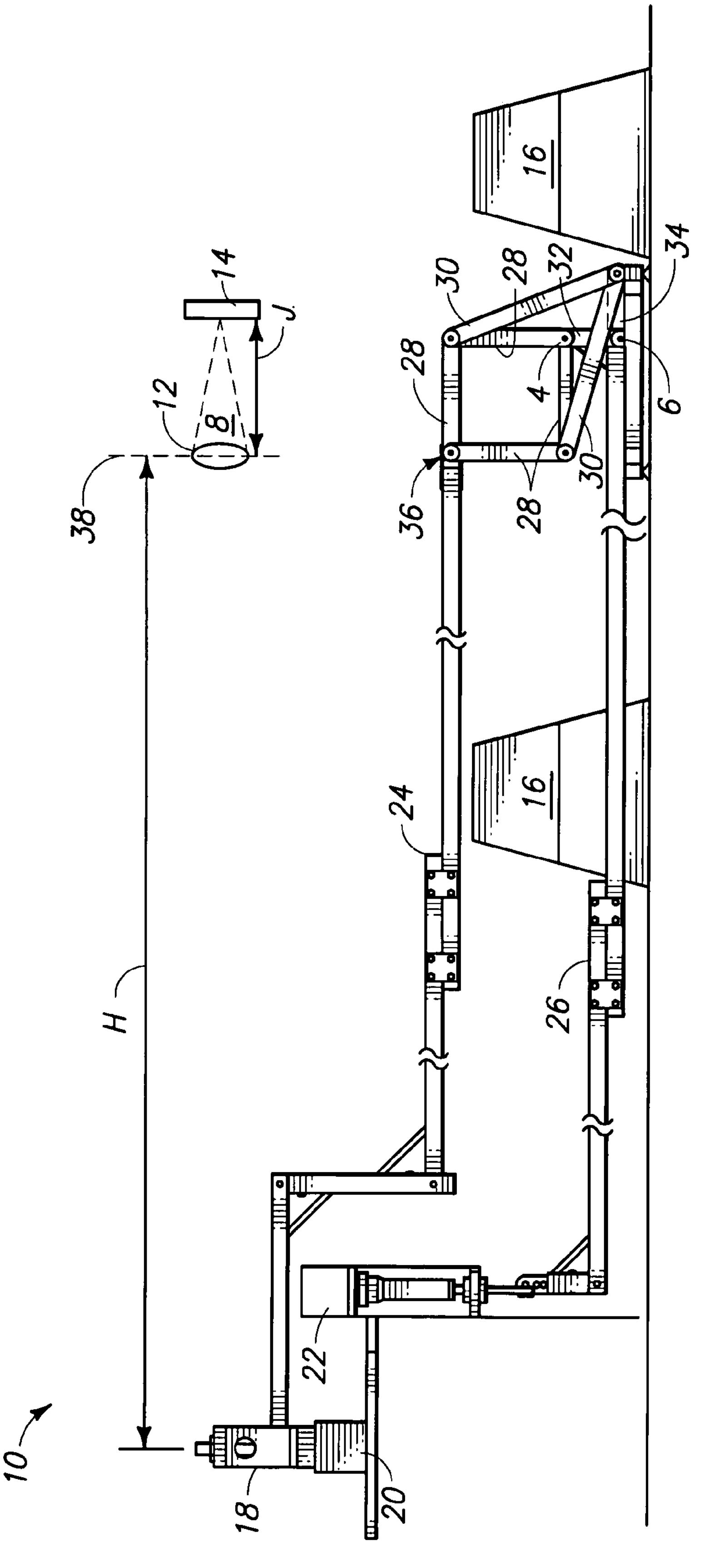
FIG. 1 is a side view of selected features of a laser device according to one aspect of the invention.

FIG. 1 provides one of several possible examples of the subject laser device and can be used to illustrate the concept of mechanical resolution being less than spatial resolution. A laser device 10 of FIG. 1 includes a lens 12 positioned to focus laser energy 8 at a target position 14. Although lens 12 is shown in FIG. 1, other optical components can be substituted for lens 12 in keeping with a particular application for the invention selected from among the various possibilities. Any optical component suitable according to the knowledge of those skilled in the art can be used, including multi-element optics. A virtual source 18 provides laser energy in FIG. 1. Using a virtual source can yield particular advantages described in further detail herein, however, any laser energy source can be used that is suitable to a particular application according to the knowledge of those skilled in the art. Target position 14 is shown separated from lens 12 by a distance J. Lens 12 is, in turn, shown separated from virtual source 18 by a distance H.

Multiplication of the resolving power of laser device 10 can be accomplished when distance H is greater than distance J. Depending on the properties of lens 12 or another optical component, spatial resolution of laser energy at the target position can approximately equal the mechanical resolution of positioning virtual source 18 multiplied by a ratio of distance J to distance H. In the case where mechanical resolution is about 5 micrometer (μm) and the ratio J/H is about 0.1, spatial resolution can be about 0.5 μm.

Mechanical resolution in laser device 10 is essentially the minimum controlled displacement per step of stepper or servo motors used to move virtual source 18. In other devices within the scope of the present aspect of the invention, mechanical resolution could be related to movement of optical components, sample targets, and other devices. Spatial resolution in laser device 10 is essentially the minimum controlled displacement of laser energy at target position 14. As a numeric measure of resolution, e.g. μm, decreases in value, finer resolution is provided and resolution is thus described to increase. As the numeric measure of resolution increases in value, less fine resolution is provided and resolution thus decreases. In the exemplary case of chemical imaging, finer resolution provides improved imaging so it follows that resolution is properly described as greater.

Preferably, at least one of distance H and distance J in a laser device can be altered, modifying the spatial resolution. In laser device 10, decreasing distance H by moving lens 12 closer to virtual source 18 also increases distance J and thus decreases spatial resolution. However, distance J and distance H can be independently altered and increase or decrease the ratio to accordingly modify spatial resolution. Distance J and distance H can also be altered without modifying spatial resolution.

Mechanical resolution of positioning a laser source can be less than spatial resolution of laser energy in at least one direction of laser source motion. For example, in laser device 10, mechanical resolution of laterally positioning virtual source 18 can be less than lateral spatial resolution of laser energy 8 at target position 14. In keeping with the principles described herein, mechanical resolution of vertically positioning virtual source 18 can be less than vertical spatial resolution of laser energy 8 at target position 14. It is further conceivable that lateral and vertical spatial resolution could exhibit different values. The different values can be the result of different values for lateral and vertical mechanical resolution and/or different optical effects for lateral source positioning compared to vertical source positioning.

Figure 3B:
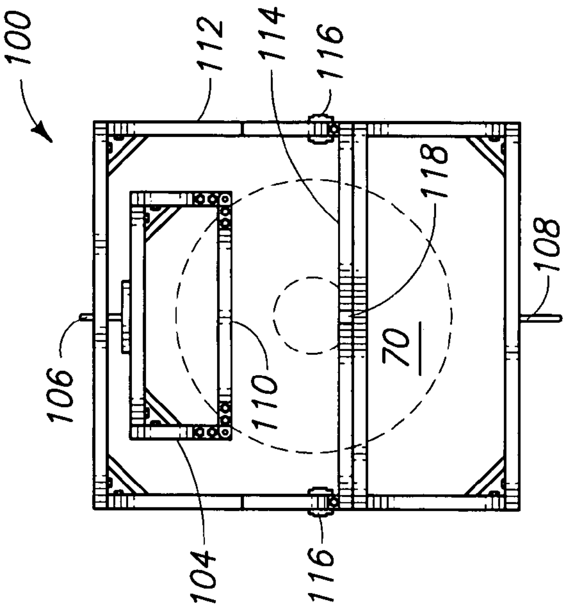
FIGS. 3A to 3C are respective side, front, and top views of selected features of a laser device according to another aspect of the invention.
Figure 3A:
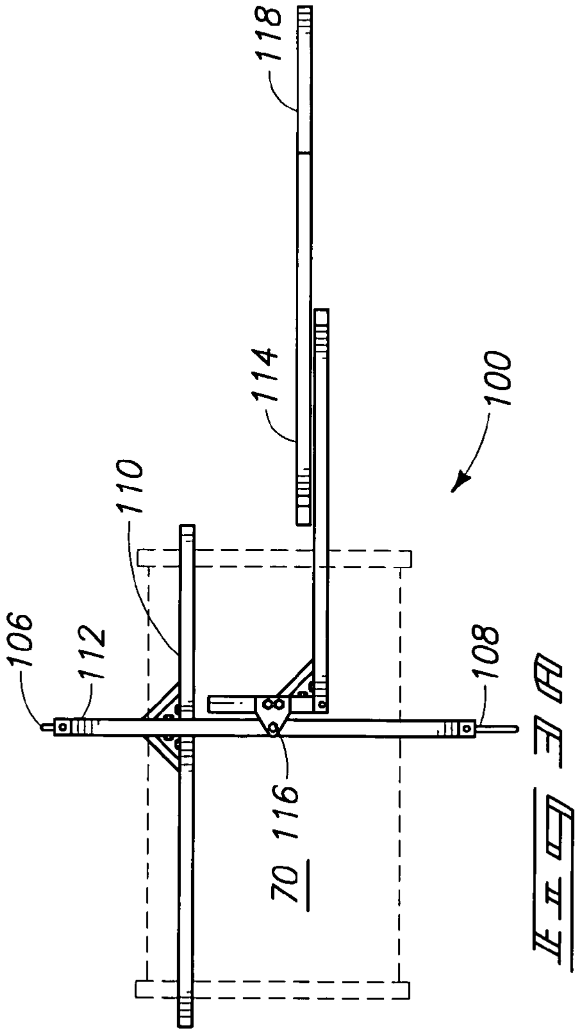
Figure 3C:
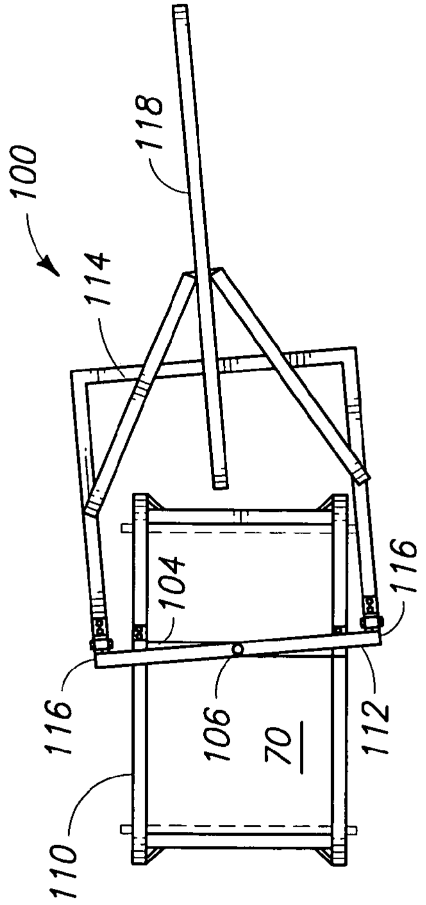

FIGS. 3A-3C provides another of several possible examples of a laser device and can be used to illustrate the concept of mechanical resolution being less than spatial resolution in both lateral and vertical positioning of a laser source. FIG. 3A-3C show a gimbal system 100 placed on a magnet 70. Although the structure of gimbal system 100 is adapted to rest on magnet 70, those of ordinary skill will recognize from the descriptions herein that gimbal system 100 can be adapted to provide described advantages in a variety of other applications. Gimbal system 100 includes a bracket 110 resting on or attached to magnet 70. Bracket 110 provides a platform for stable attachment of arch 104 including a top pivot 106. A lateral index frame 112 is rotationally mounted on top pivot 106 such that lateral index frame 112 can rotate about top pivot 106. Lateral index frame 112 includes a bottom pivot 108 positioned such that top pivot 106 and bottom pivot 108 define a lateral index about which lateral index frame 112 rotates. Bottom pivot 108 can be mounted to an additional device (not shown) stabilizing the position of pivot point 108 with respect to the indicated lateral index. One example of such additional device includes a height adjustment device that can be used to raise and lower lateral index frame 112 sliding on top pivot 106.

Gimbal system 100 further includes a vertical index frame 114 linked to lateral index frame 112 at pivots 116. Vertical index frame 114 in turn includes an optical bench 118. Vertical index frame 114 can thus be rotationally mounted to lateral index frame 112 such that pivots 116 define a vertical index. In the examples of FIGS. 3A-3C, the described vertical index and lateral index intersect, although it is conceivable that lateral and vertical indices might not intersect.

In gimbal system 100, a laser source can be linked to optical bench 118 such that gimbal system 100 comprises a manipulation mechanism of the laser source. Gimbal system 100 thus exemplifies a manipulation mechanism providing an approximate center of lateral pivot for lateral motion as well as an approximate center of vertical pivot for vertical motion. Vertical motion of optical bench 118 rotates about pivots 116 and lateral motion of optical bench 118 rotates about top pivot 106 and bottom pivot 108. An optical component such as lens 12, can be placed within magnet 70 such that a lateral index of the optical component coincides with the lateral index of gimbal system 100 and a vertical index of the optical component coincides with the vertical index of gimbal system 100. A target position can also be defined such that a distance H and distance J as described in FIG. 1 are provided where distance H is greater than distance J. When spatial resolution approximately equals mechanical resolution multiplied by a ratio of distance J to distance H, the same ratio J/H can apply to both lateral mechanical resolution and vertical mechanical resolution. Altering of at least one of distance H and distance J can thus modify lateral spatial resolution in a similar manner to vertical spatial resolution.

The possibility of altering distance H and distance J, especially where distance H can be greater than distance J, can be used to an advantage. According to another aspect of the invention, a laser device can include a target position located within an adverse environment, an optical component separated from the target position, and a laser energy source located outside the adverse environment. The laser device further includes a laser source manipulation mechanism comprising electromechanical parts all of which are located outside the adverse environment. The manipulation mechanism aims the laser source through the optical component at the target position. As one example, the adverse environment can include at least one of a high magnetic field, a vacuum system, a high pressure system, and a hazardous zone. Possible examples of hazardous zones include zones that may damage or contaminate the laser energy source or electromechanical parts of manipulation mechanism such as corrosive, toxic, radioactive, etc. environments in addition to other adverse environments listed above. An adverse environment may further include an environment toward which the laser source or parts of the manipulation mechanism may be adverse. For example, parts of the laser device might not be suitable for operation in a clean room environment even when the clean room environment does not damage or contaminate the laser device.

As shown in FIG. 1, an apparatus containing or generating an adverse environment can rest on footings 16 such that virtual source 18, a lateral stepper 20, and a vertical stepper 22 can be outside the adverse environment. In the particular example of FIG. 1, lens 12 is located within the adverse environment generated between footings 16 along with target position 14. However, lens 12 could be moved outside the adverse environment, decreasing distance H and increasing distance J. Also, target position 14 could be moved closer to virtual source 18 but within the adverse environment between footings 16 while maintaining distance J as shown and placing lens 12 outside the adverse environment.

Figure 6:
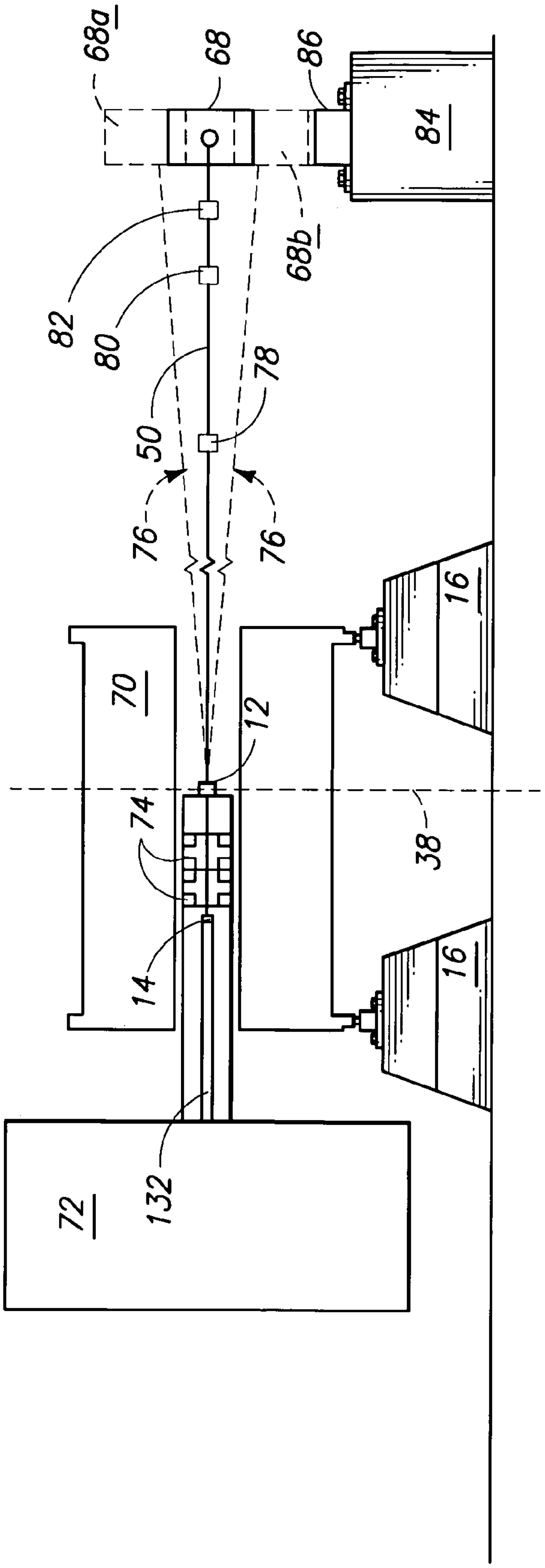
FIG. 6 is a side view of selected components of a laser device used as a laser desorption mass spectrometer.
Figure 7:
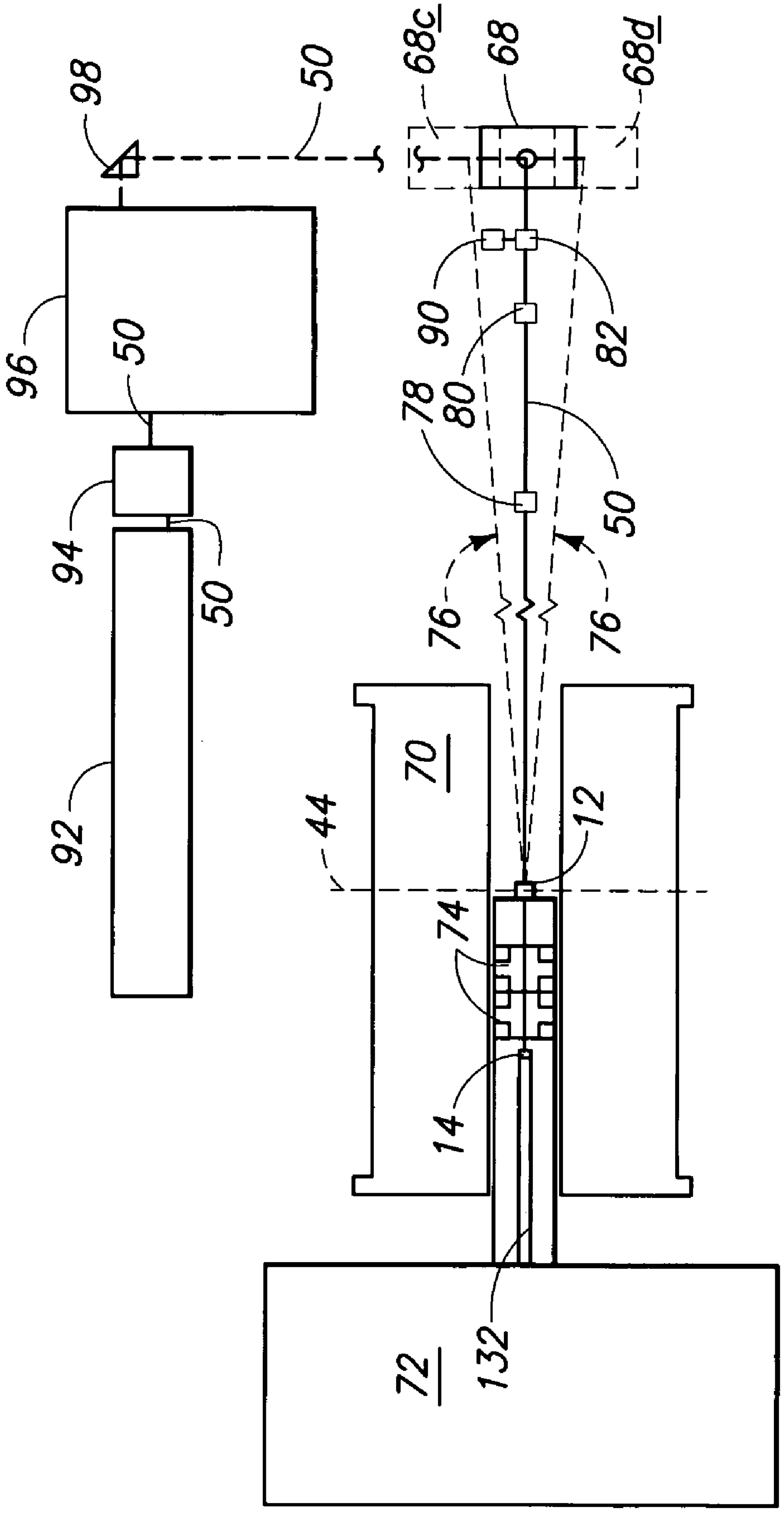
FIG. 7 is a top view of the selected components shown in FIG. 6.

FIGS. 6 and 7 show one example of a target position located within an adverse environment and a laser source and electromechanical parts located outside the adverse environment. FIGS. 6 and 7 show respective side and top views of target position 14 located within a vacuum system 72 wherein the portion of the vacuum system surrounding target position 14 is further within magnet 70. Magnet 70 generates a high magnetic field that may hinder operation of an electromechanical part. Accordingly, a lateral stepper and vertical stepper (not shown) are located outside an adverse portion of such high magnetic field and are associated with virtual source 18. Footings 16 are shown in FIG. 6 with magnet 70 resting thereon. Lens 12 is thus also located within the high magnetic field. The distance between lens 12 and virtual source 18 allows protection of a manipulation mechanism for aiming virtual source 18 as well as resolution enhancement as discussed herein.

A further desire in increasing reproducible aiming of a laser device includes indexing to provide the ability to return laser aiming to a particular location at a target position. According to a further aspect of the invention, a laser device includes a target position, and optical component separated a distance J from the target position, and a laser energy source separated a distance H from the optical component. The laser device further includes a laser source manipulation mechanism having a mechanical index. The mechanical index includes a pivot point for lateral motion and a reference point for vertical motion. Lateral displacement of the laser source can produce a related, predictable lateral displacement of laser energy at the target position as directed through the optical component. The lateral displacement may be referenced to the mechanical index such that return of the laser source to a particular position with respect to the mechanical index also returns the laser energy to a corresponding target position. In keeping with another aspect of the invention, laser energy lateral displacement at the target position can approximately equal laser source lateral displacement multiplied by the ratio of distance J to distance H.

Figure 15:
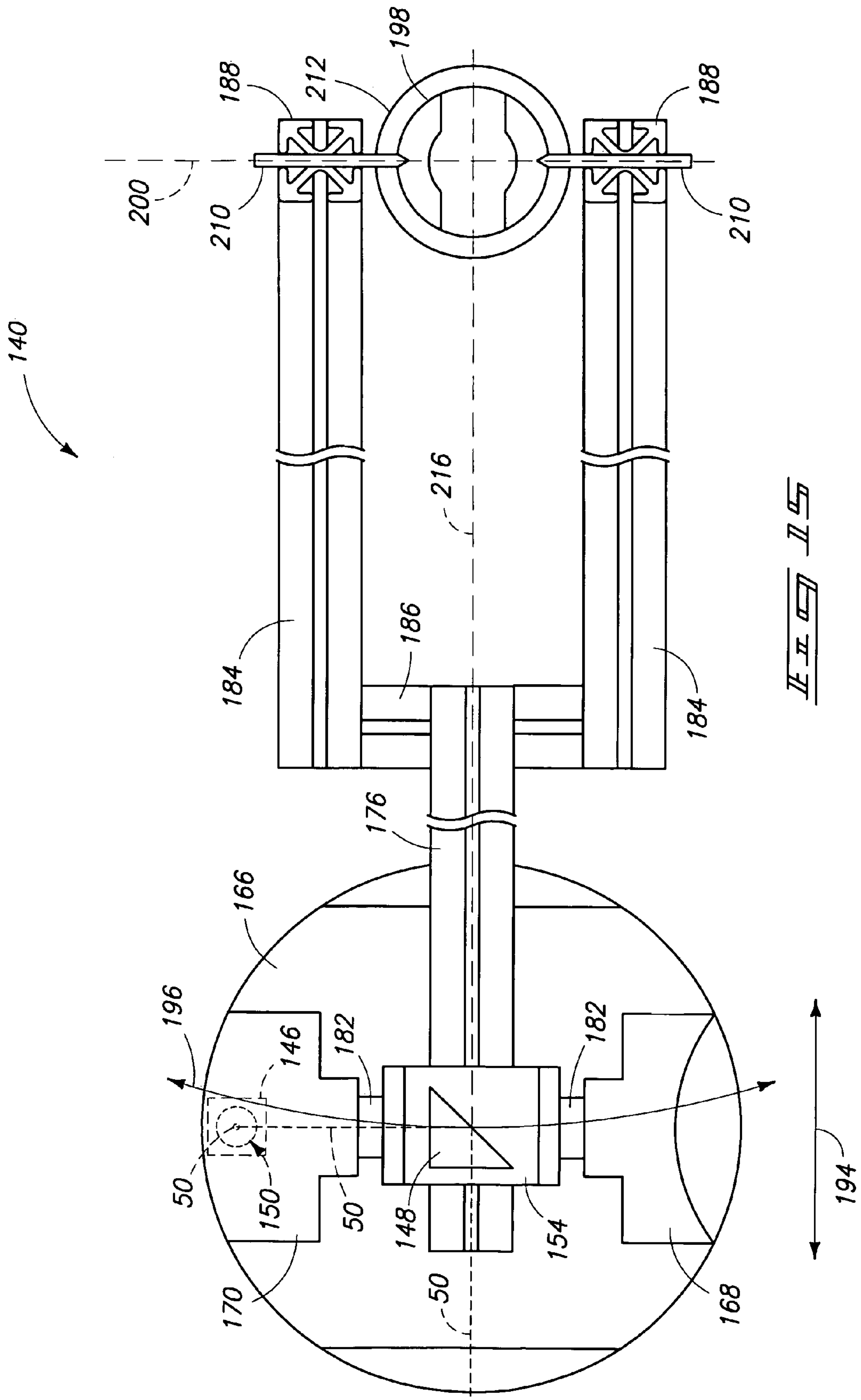
FIG. 15 is a top view of the laser device shown in FIG. 13 configured to show a different aspect of the invention.
Figure 16:
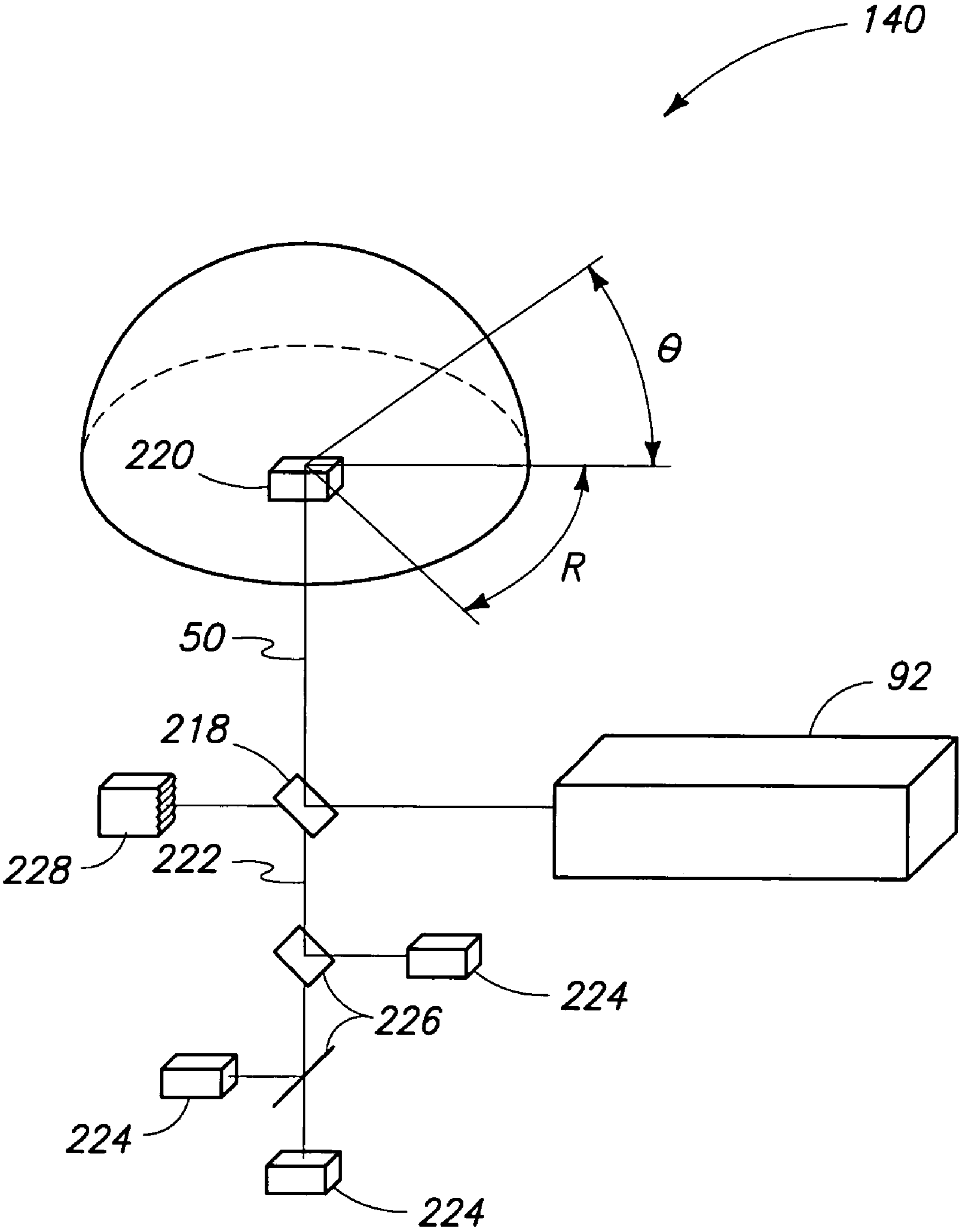
FIG. 16 is a perspective view of selected features of a laser device according to a still further aspect of the invention.

In the case where distance J equals distance H, mechanical resolution can equal spatial resolution. However, such configuration can still provide the advantage of locating selected parts of a laser device outside an adverse environment, as well as other advantages. Distance J may even be greater than distance H. Such a configuration may provide less resolution at the target, however, it may allow laser energy to traverse greater distances and/or cover larger target areas. This can be useful in precise mapping or surveying of geography, in controlling robotic manufacturing of large parts, or in powering distant sensors with laser energy. Additionally, a laser device might be used for tracking moving objects in either configuration J>H, J=H, or J<H. In the case of J>H, controllers may more slowly displace a laser source compared to the moving object to maintain contact with the object. For example, a laser source moving at one meter per second with a J/H ratio of 27 can track a vehicle traveling at 60 miles per hour. Accordingly, satellite, missile, airplane, and ship tracking may also be possible. FIGS. 14-16, among others discussed herein, provide examples of devices that may aim lasers over great distances.

Laser device 10 shown in FIG. 1 provides one example among several possibilities of a mechanical index. A lateral index 38 can be defined for lens 12. A lateral index can be similarly defined for other optical components. Laser device 10 also includes a pivot point 36 having an approximate center of lateral pivot approximately coincident with lateral index 38. Accordingly, pivot point 36 can comprise a mechanical index of a manipulation mechanism for virtual source 18 comprised by laser device 10. Virtual source 18 is thus indexed to lens 12. Such indexing can provide that laser energy from virtual source 18 passes through lateral index 38 regardless of vertical displacement of virtual source 18. As further described herein, the structure and operation of a laser source, such as virtual source 18, combined with a mechanical index can also provide laser energy passing through lateral index 38 throughout varying positions of lateral displacement. Laser aim can thus be auto aligned to lateral index 38 during laser source lateral and/or vertical motion.

Laser device 10 also accommodates vertical displacement of virtual source 18. Vertical stepper 22 lifts one end of a vertical operating rod 26 nearest vertical stepper 22. The opposite end of vertical operating rod 26 swivels about a pivot point 6 and imparts angular motion to a ratio arm 32 also about pivot point 6. The end of ratio arm 32 opposite pivot point 6 thus moves in an arc. Instead of linking vertical operating rod 26 to ratio arm 32 as shown, vertical operating arm 26 can be attached along ratio arm 32 above pivot point 6. In such case, ratio arm 32 can still rotate about pivot point 6. However, as vertical stepper 22 lifts one end of vertical operating rod 26 imparting angular motion to ratio arm 32, vertical operating rod 26 rotates about a virtual pivot point past the opposite end of vertical operating rod 26. Other variations in imparting angular motion to ratio arm 32 are conceivable according to the knowledge of those skilled in the art and are encompassed herein.

Ratio arm 32 forms a part of a Peaucellier linkage. The Peaucellier linkage of FIG. 1 further includes a ratio arm 34, support arms 30, and diamond arms 28. Ratio arm 34 essentially defines the distance from pivot point 6 to the point where support arms 30 are joined together. As an alternative, ratio arm 34 can be replaced by a bracket attached to other structural features, maintaining a desired distance between pivot point 6 and the point where support arms 30 are joined together. Ratio arm 32 is linked at a pivot point 4 to two of diamond arms 28. Pivot point 36 described above exists at an opposite corner in relation to pivot point 4. As vertical operating rod 26 imparts angular motion to ratio arm 32, pivot point 4 moves in an arc along with the end of ratio arm 32. Such arcuate motion of pivot point 4 causes pivot point 36 to move vertically along a linear path. Given the disclosure herein, a variety of Peaucellier mechanisms could be used as an alternative to accomplish the described functions of the apparatus in FIG. 1.

Accordingly, pivot point 36 can move vertically in a linear motion tracking a linear center of lateral pivot and coinciding with lateral index 38. By altering the relative lengths of ratio arm 32 and 34, pivot point 36 can instead track a curve. For example, pivot point 36 could track a convex or concave surface of a lens. Such a curve tracking feature may have useful application in one of the various possible uses of the aspects of the present invention.

Preferably, vertical displacement of a manipulation mechanism index produces a related, predictable vertical displacement of laser energy at the target position as directed through an optical component. In FIG. 1, vertical displacement of pivot point 36 vertically moves operating rod 24, in turn vertically moving inner components of virtual source 18. A pendulum can be linked to the laser source such that vertical displacement of the mechanical index controls a vertical angle of laser energy departure from the laser source at least in part with the pendulum.

Figure 2:
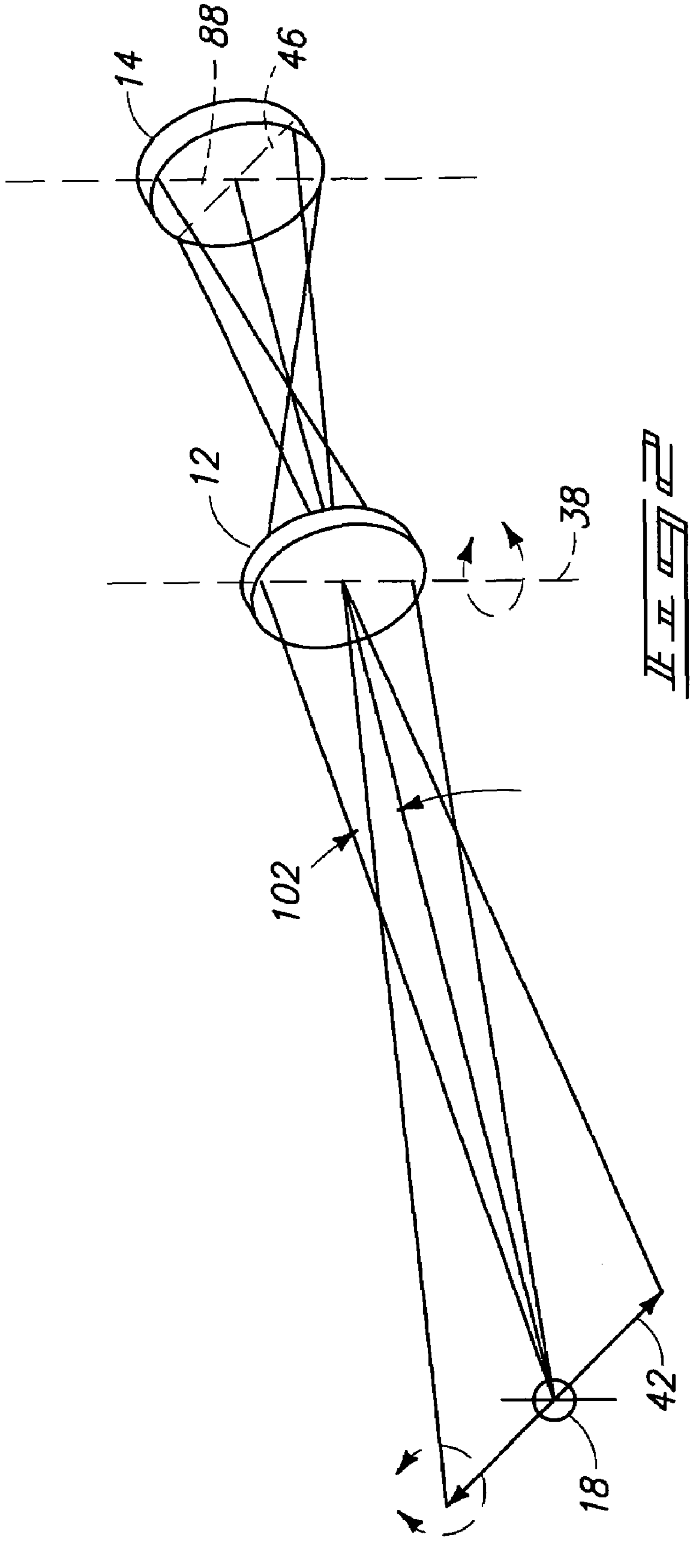
FIG. 2 is a diagram of auto aligned laser energy through a lateral index.

FIG. 2 provides a schematic of lens 12 having a lateral index 38. Lateral source displacement 42 is shown for virtual source 18 and a vertical angle of departure 102 is also shown. Lateral source displacement 42 is indexed to lateral index 38. Accordingly, lateral laser aim is auto aligned through lateral index 38 and produces lateral energy displacement 46 at target position 14. Variation in vertical angle of departure 102 is inverted through lens 12 providing vertical energy displacement 88 as shown superimposed at target position 14. A laser device functioning as shown is FIG. 2 can be described to include a single index scan mechanism. The optional pendulum described above that can be linked to a laser source rotates about the line representing lateral source displacement 42. By converting vertical displacement of a mechanical index, such as pivot point 36, to a vertical angle of laser energy departure, vertical displacement of laser energy at target position 14 can be accomplished. Accordingly, pivot point 36 does not comprise a pivot point for vertical motion but rather comprises a reference point. Virtual source 18 is still indexed to pivot point 36 as to lateral aiming of virtual source 18. However, vertical motion is not indexed to pivot point 36 since the true pivot point for virtual source 18 vertical motion lies within virtual source 18.

Vertical displacement of laser energy at target position 14 can occur by moving laser energy vertically across the face of lens 12 or another optical component. However, the vertical displacement at lens 12 corresponding to vertical energy displacement 88 at target position 14 might not be a linear relationship. Correction for a non-linear correspondence is possible but may be cumbersome. The magnitude of lateral source displacement 42 preferably corresponds in a linear relationship to the magnitude of lateral energy displacement 46 at target position 14.

Laser device 10 is described herein as including a lateral index passing through an optical component, but according to FIG. 2 does not include a vertical index passing through lens 12. However, the apparatuses described herein as useful for establishing a lateral index can be altered to establish a vertical index. For example, pivot point 36 can be used to establish at least one of a lateral index and a vertical index.

According to a still further aspect of the invention, a laser device includes an optical component, a laser energy source separated from the optical component, and a laser source manipulation mechanism including a Peaucellier linkage. The manipulation mechanism aims the laser source through the optical component. The Peaucellier linkage can be used to impart vertical motion and can instead be oriented to impart lateral motion.

Further advantages exist to combining a vertical index and a lateral index in a laser device. Another aspect of the invention provides a laser device including an optical component having a vertical index and a lateral index that intersect at an origin, a laser energy source aimed at the origin, and a laser source manipulation mechanism. The manipulation mechanism links vertical and lateral laser source motion to the respective vertical and lateral indices and auto aligns laser aim through the origin during laser source motion. Gimbal system 100 shown in FIGS. 3A-3C provides one example of a device that can be comprised by the described manipulation mechanism and exhibit the stated features. A lateral index can be defined for an optical component that coincides with a lateral index defined by top pivot 106 and bottom pivot 108 of lateral index frame 112. A vertical index can be defined for an optical component that coincides with a vertical index defined by pivots 116 of vertical index frame 114. Optical bench 118 can be linked to a laser source such that lateral laser source motion is physically linked to the optical component lateral index. Similarly, vertical laser source motion can be physically linked to the optical component vertical index. When optical component vertical and lateral indices intersect at the origin, laser aim can be auto aligned through the origin during laser source motion.

Figure 4:
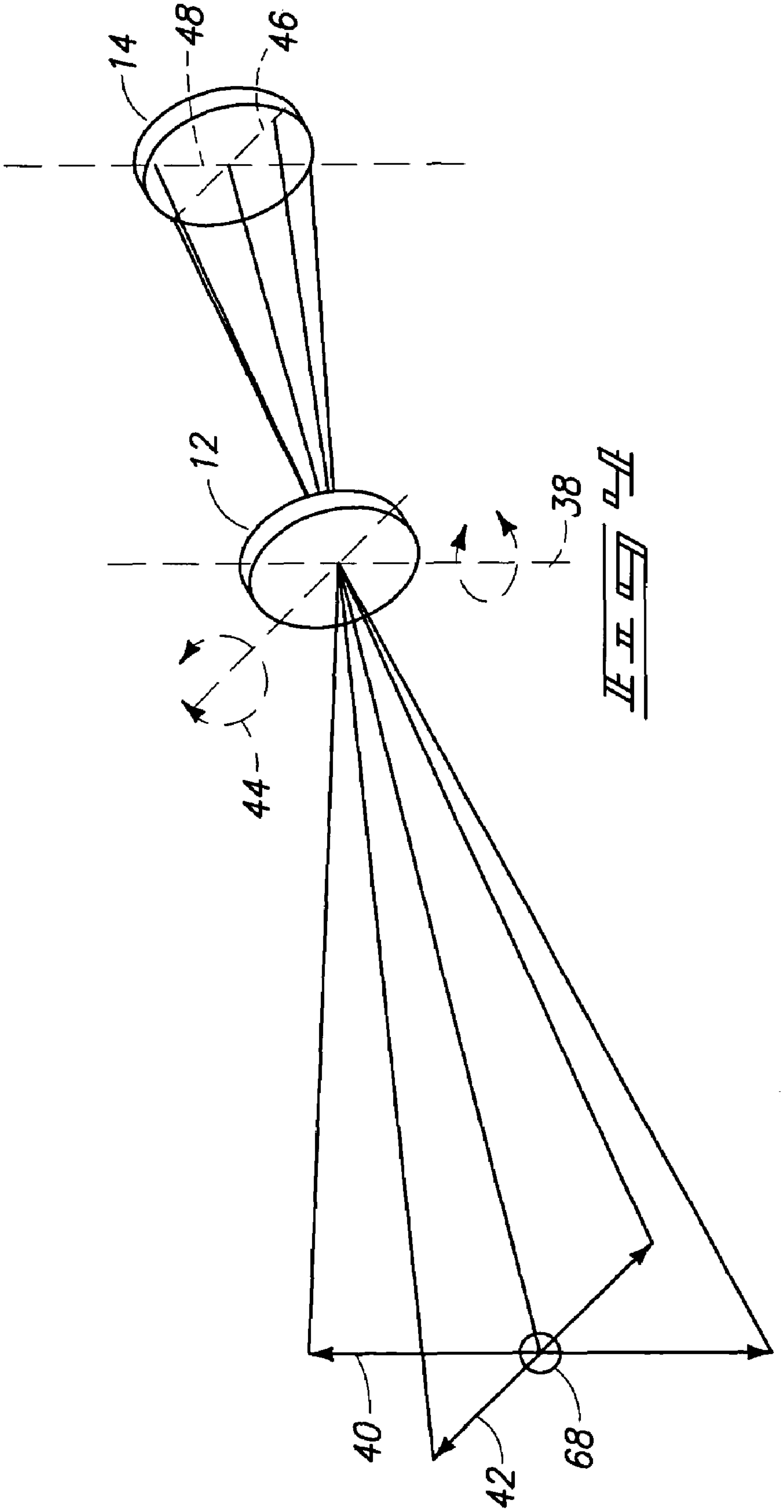
FIG. 4 is a diagram of auto aligned laser energy through the origin of a binary index.

FIG. 4 provides a schematic of lens 12 having lateral index 38 and a vertical index 34. Vertical source displacement 40 is shown for a virtual source 68 and lateral source displacement 42 is also shown. Vertical source displacement 40 is indexed to vertical index 44 and lateral source displacement 42 is indexed to lateral index 38. Since lateral index 38 and vertical index 34 intersect, laser aim is auto aligned through the origin where the indices intersect during laser source motion. Orienting lens 12 to position the origin at the center of lens 12 allows laser energy to pass directly through lens 12 forming a corresponding image of applied laser energy at target position 14. Lateral energy displacement 46 and vertical energy displacement 48 are shown superimposed at target position 14.

Figure 5:
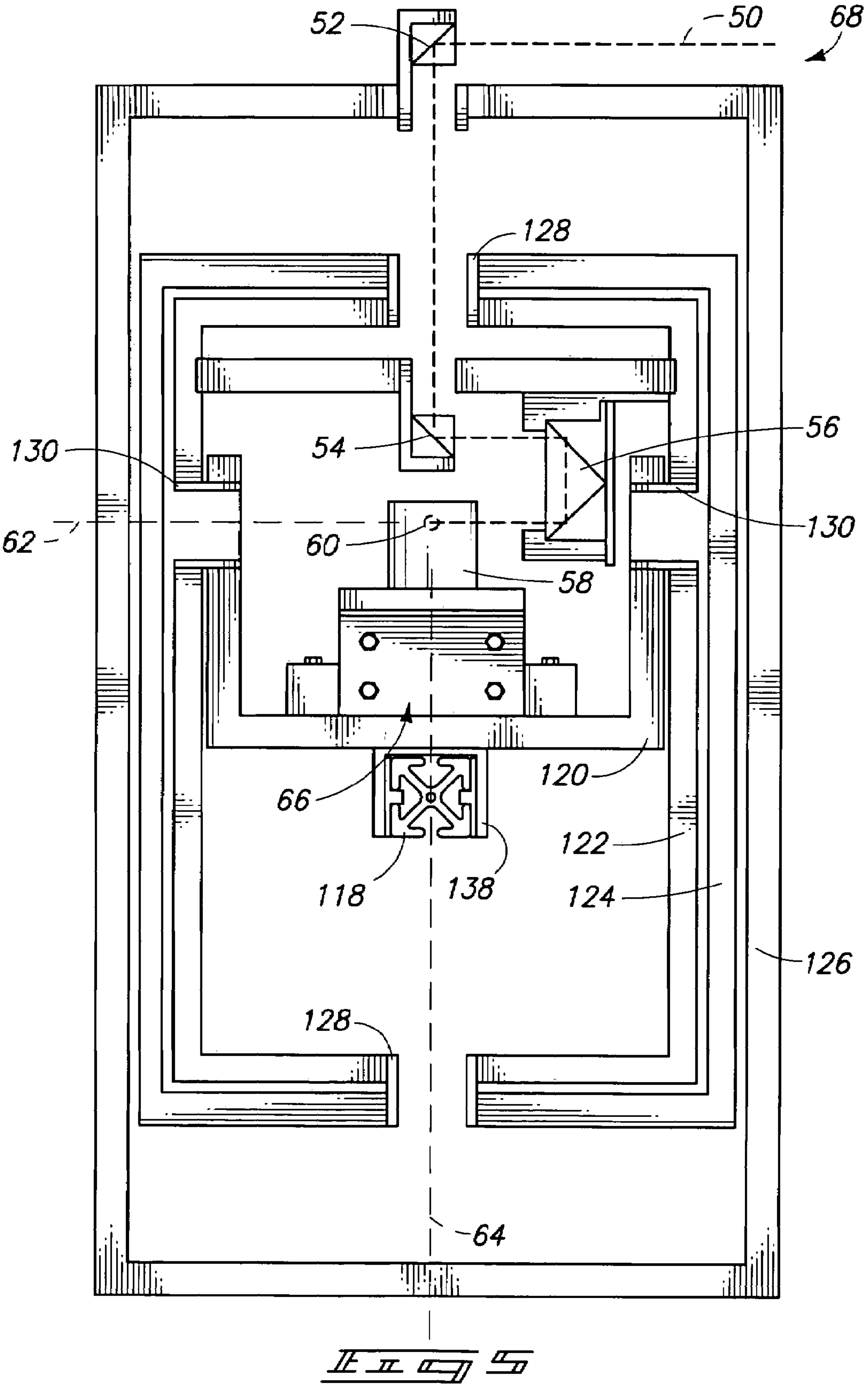
FIG. 5 is a cross sectional view of a virtual source used with the laser device of FIGS. 3A to 3C.

Generally speaking, a gimbal is a device with two mutually perpendicular and intersecting axes of rotation, providing angular motion in two directions. FIGS. 3A-3C provide an example of a gimbal adapted to resting on magnet 70, laser aiming into magnet 70, and linking with a virtual source such as shown in FIG. 5. Other adaptations of a gimbal providing manipulation mechanism features and advantages are conceivable for other applications and laser sources. One possible adaptation includes a virtual gimbal system. A virtual gimbal system, such as a set or array of laser beams and sensors, can be designed to track position of a laser energy source relative to a target position. Information from the sensors could provide feedback to a control system maintaining the desired laser aim. A virtual gimbal system could facilitate using the laser devices described herein for hazardous zones or across distances greater than practical for a mechanical gimbal system. A virtual gimbal system could nevertheless embody the concept of providing at least one of a lateral index and a vertical index. Such indices could be virtual, rather than dictated by a physical link to the laser energy source.

Notably, the dual indexing of virtual source 68 to a point within lens 12 allows precise reproduction of laser energy position at target position 14. Further, mechanical resolution of vertical source displacement 40 and lateral source displacement 42 can be enhanced for vertical energy displacement 48 and lateral energy displacement 46. At least one of vertical source displacement 40 and lateral source displacement 42 can be linear, as shown. Also, target position 14 can be planar, as shown. For the FIG. 4 schematic of a dual index scan mechanism, the magnitude of vertical and lateral source displacement 40, 42 each correspond in a linear relationship to a magnitude of vertical and lateral energy displacement 48, 46, respectively, at target position 14. A linear relationship for positioning source 68 and obtaining related, predictable positioning of laser energy can be very convenient and assist in achieving a high level of reproducibility.

In another aspect of the invention, a laser energy source has a lateral rotational axis during lateral motion and a vertical rotational axis during vertical motion. The lateral axis and vertical axis can intersect at an axes origin from which the laser energy emanates independent of laser source position. A laser source manipulation mechanism can laterally and vertically position the laser source and easily maintain laser aim through an optical component given the two rotational axes of the laser source. Further, the laser source can be wavelength independent throughout both lateral and vertical motion.

Turning to FIG. 5, a cross sectional view of virtual source 68 is shown. Laser energy 50 passes through virtual source 68 emanating from laser exit 60 at the surface of a prism 58. Upon exiting a true laser source, such as shown in FIG. 7, laser energy 50 enters virtual source 68 at the top through lateral transmission prism 52. Lateral transmission prism 52 guides laser energy into lateral rotation prism 54. Laser energy exits lateral rotation prism 54 to enter prism 56 which turns the beam 180° applying the lateral rotation from prism 54 to laser energy entering prism 58. Prism 58 rotates about a lateral axis 64 including laser exit 60.

Prism 58 can be mounted on a kinematic stage 66 for precise final positioning. A four axis kinematic stage Model 6071 available from New Focus, Inc. in Santa Clara, Calif. is one example of a suitable kinematic stage 66. Kinematic stage 66 can be mounted on a swing 120 that has a vertical axis 62 normal to a desired path of laser energy emanating from laser exit 60. Vertical axis 62 can be collinear with laser energy 50 from prism 56. Accordingly, laser energy 50 emanates from an axes origin of intersecting lateral axis 64 and vertical axis 62. Swing 120 is shown nested within a first box 122 and coupled to first box 122 with vertical bearings 130. Vertical bearings 130 allow swing 120 to rotate within first box 122 about vertical axis 62. First box 122 is in turn nested within a second box 124 and coupled thereto with lateral bearings 128. First box 122 thus rotates within second box 124 about lateral axis 64. Accordingly, both rotations about lateral axis 64 and vertical axis 62 are combined at a single point coinciding with laser exit 60 on a hypotenuse of prism 58. Maintaining laser energy 50 normal to prism faces at all angles ensures wavelength independence of virtual source 68 such that prism changes can be avoided when a wavelength of laser energy 50 is altered. Although virtual source 68 is achromatic, the odd number of refractions causes the profile of the laser energy 50 emanating from laser exit 60 to be the mirror image of laser energy 50 entering virtual source 68.

It is an advantage of the virtual source 68 that is dynamically positions prisms 54, 56, and 58 during motion of virtual source 68 to maintain laser energy 50 through virtual source 68. Operator adjustment of prisms is not needed during or after movement of virtual source 68. Instead, virtual source 68 self-adjusts the prisms during its motion. This may be contrasted to a true laser energy source providing laser energy 50 that may be static, not changing the direction in which it provides laser energy 50 even though the exiting laser energy changes direction.

Second box 124 is positioned within a third box 126 acting as a guide for second box 124 during vertical motion. Second box 124 preferably moves approximately linearly within third box 126. Vertical motion can be accomplished by a variety of mechanisms, including an auger screw (not shown) interfaced with second box 124 behind laser exit 60. Such an auger can be operated by a variety of stepper and/or servo motors. Virtual source 68 lateral motion preferably occurs approximately linearly as well. Lateral motion can be accomplished with another auger screw (not shown) interfaced to third box 126 and also operated by a stepper and/or servo motor.

An absolute position of laser exit 60 can be determined independent of the mechanical resolution and thus confirm where laser exit 60 is located after lateral and/or vertical displacement. For indexed lateral and/or vertical displacement, knowledge of absolute source position can provide knowledge of absolute energy position at the target. While the mechanical resolution describes the amount of laser source motion, absolute position describes the ending location after such motion. Absolute position can be determined with feedback from optical encoders for each axis of motion of the virtual source. The encoders can be incorporated into the virtual source and exhibit a resolution less than the mechanical resolution. The encoders can thus provide increased energy position resolution at the target. As an example, the encoders can have a resolution of about 0.1 μm in the virtual source. Absolute position at the laser source can be enhanced to greater resolution at the target. For a J/H ratio of 0.1, an absolute source position resolution of 0.1 μm yields an absolution energy position resolution of 0.01 μm at the target.

An operating rod of a laser source manipulation mechanism can be linked to virtual source 68. For example, optical bench 118 of gimbal system 100 shown in FIG. 3 can be linked using a low friction slide 138 attached to swing 120 below prism 58. Virtual source 68 is displaced approximately linearly during lateral motion and optical bench 118 rotates laterally along with lateral index frame 112 about a lateral index defined by top pivot 106 and bottom pivot 108. The low friction slide allows for small differences in distance from virtual source 68 to the lateral index of gimbal system 100 as virtual source 68 traverses the desired path. Similar changes in distance and allowances for such changes can occur while virtual source 68 traverses a desired vertical path with optical bench 118 rotating along with vertical index frame 114 about a vertical index defined by pivots 116.

Even though laser source 68 can move approximately linearly in both lateral and vertical motion, laser energy 50 aim can be auto aligned throughout such motion. Laser aim can thus be auto aligned to vertical and/or lateral indices of an optical component during laser source motion. Virtual source 68 linked to a laser source manipulation mechanism with a slide attached to swing 120 provides one example of auto alignment. As virtual source 68 moves laterally and linearly from an approximate center of lateral pivot coincident with an optical component lateral index, first box 122 rotates about lateral axis 64 and laser energy 50 aim is maintained along the optical component lateral index. Similarly, as virtual source 68 moves vertically and linearly from an approximate center of vertical pivot coincident with the optical component vertical index, laser energy 50 aim is maintained along the optical component vertical index.

As can be appreciated from FIG. 4, vertical and lateral linear displacement of laser source 68 changes distance H to the optical component. However, for a planar target position 14, distance J to the optical component also increases. Thus, the ratio J/H remains unchanged throughout displacement of laser source 68. If vertical and/or lateral laser source displacement was arcuate instead and distance H remained constant, then ratio J/H would change throughout displacement for a planar target position 14.

Turning to FIGS. 6 and 7, a laser desorption spectrometer is shown comprising the auto alignment aspect and other aspects of the invention described herein. FIG. 6 shows a side view of selected portions of a laser desorption spectrometer and FIG. 7 shows a top view. FIG. 6 shows laser energy 50 emanating from virtual source 68 and passing through lens 12 onto target position 14. Target position 14 is located within a vacuum system 72 at the tip of a probe bar 132. The portion of vacuum system 72 containing target position 14 is also within a high magnetic field that can hinder operation of electromechanical devices. The high magnetic field is generated by magnet 70 having a magnitude of up to about 7.0 Tesla (70,000 Gauss). "High" magnetic fields are typically greater than about 50 Gauss, but some electromechanical devices may exhibit a particular sensitivity to magnetic fields such that a lower magnitude of a high magnetic field could hinder operation of the electromechanical device. At least one desorbed energy detection cell can be provided to allow operation as a laser desorption spectrometer. FIG. 6 shows two detection cells 74 positioned within magnet 70.

Virtual source 68 rests on a lateral slide 86 in turn resting on a footing 84 and magnet 70 rests on footings 16, allowing precise and accurate reproduction of laser energy 50 position at target position 14. A travel limit 76 is shown as a function of physical constraints for the particular arrangement in FIGS. 6-7. The small center bore of magnet 70 and the location of target position 14 within magnet 70 constrain the travel limit as shown since magnet 70 obstructs laser energy 50 at a larger travel limit. Certainly, travel limit 76 can be altered depending on the location of target position 14 within some device and the physical structure of such device. The upper travel limit 68*a* and lower travel limit 68*b* are shown about 9° apart. Notably, laser energy 50 from virtual source 58 continues to pass through lens 12 at upper and lower travel limits 68*a,b* since virtual source 68 is indexed to vertical index 44 shown in FIG. 7.

Although not shown in FIGS. 6-7, a laser source manipulation mechanism as described herein can be used to index virtual source 68 to vertical index 44. Gimbal system 100 of FIGS. 3A-3C is one example of a suitable manipulation mechanism. Gimbal system 100 also includes a convenient optical bench 118. FIG. 6 shows an iris 78, a beam expander 80, and a variable beam splitter 82 that process laser energy 50 between virtual source 68 and lens 12. Such beam processing devices can be located on optical bench 118 of gimbal system 100 or could be located using some other structure. Since optical bench 118 can be linked to virtual source 68 with a low friction slide, the beam processing devices mounted on optical bench 118 remain in alignment throughout vertical as well as lateral laser source motion. Iris 78 and beam expander 80 provide a desired amount of laser energy fluence to a target position and other components of a laser system may be provided according to the knowledge of those skilled in the art. Variable beam splitter 82 also assists in providing a desired amount of laser fluence to a target position and allows measurement of laser fluence using an energy detector 90 shown in FIG. 7.

FIG. 7 further shows other components of a laser system such as a true laser source 92 generating laser energy 50 that passes through a separations package 94 isolating desired wavelengths of energy and passes through a dye laser head 96. A prism 98 turns laser energy 50 90° to enter virtual source 68 at lateral transmission prism 52 shown in FIG. 5. FIG. 7 also shows lateral motion of virtual source 68 along lateral slide 86 within travel limit 76. Notably, lateral source motion is indexed to lateral index 38 shown in FIG. 6. Lateral indexing can be provided by a laser source manipulation mechanism described herein, such as gimbal system 100 in FIGS. 3A-3C and laser device 10 shown in FIG. 1. Laser device 10 is expressly described as providing a lateral index and is not shown as providing a vertical index. Preferably, the manipulation mechanism selected for a laser source allows the laser source to be placed in scanning motion. A highly reproducible laser energy scanning device can be particularly useful in a laser desorption spectrometer such as shown in FIGS. 6-7.

The features and advantages of the laser devices and their components shown in FIGS. 1-7 may alternatively be obtained using the laser devices shown in FIGS. 11-16, along with potential additional features and advantages. According to one aspect of the invention, a laser device includes a virtual source configured to aim laser energy that originates from a true source. The virtual source has a vertical rotational axis during vertical motion of the virtual source and the vertical axis passes through an exit point from which the laser energy emanates independent of virtual source position. The emanating laser energy is collinear with an orientation line. The laser device includes a virtual source manipulation mechanism that positions the virtual source. The manipulation mechanism has a center of lateral pivot approximately coincident with a lateral index and a center of vertical pivot approximately coincident with a vertical index. The vertical index and lateral index intersect at an index origin. The virtual source and manipulation mechanism auto align the orientation line through the index origin during virtual source motion.

By way of example, the various alternatives and modifications for other laser devices discussed herein may be used in the present aspect of the invention, where appropriate. The virtual source lateral motion may occur linearly or curvilinearly. Also, the manipulation mechanism may position the virtual source radially with respect to the index origin. Although virtual source vertical motion may conceivably be curvilinear, that type of motion is not represented in the Figures. A laser device may additionally include at least one dynamically positioned prism that maintains the laser energy from a true laser energy source through the virtual source during virtual source positioning. The at least one dynamically positioned prism may include at least three dynamically positioned prisms. The virtual source vertical axis may be formed by a swing between two posts or nested within a first box, the laser energy emanating from a prism rotating with and mounted on the swing. Further, the virtual source may additionally include a lateral rotational axis during lateral motion of the virtual source. The lateral axis and vertical axis may intersect at an axes origin coincident with the exit point.

The laser energy may be aimed convergently, passing through the index origin. Instead, the laser energy may be aimed divergently, extending radially outward along the orientation line. In convergent aiming, the laser device may further include a target position and an optical component separated from the target position. The lateral index and vertical index may be defined for the optical component and the center of the optical component may coincide with the index origin. In divergent aiming, the laser device may further include sensors. The virtual source may be further configured to receive external energy along the orientation line and to direct it to the sensors.

Figure 11:
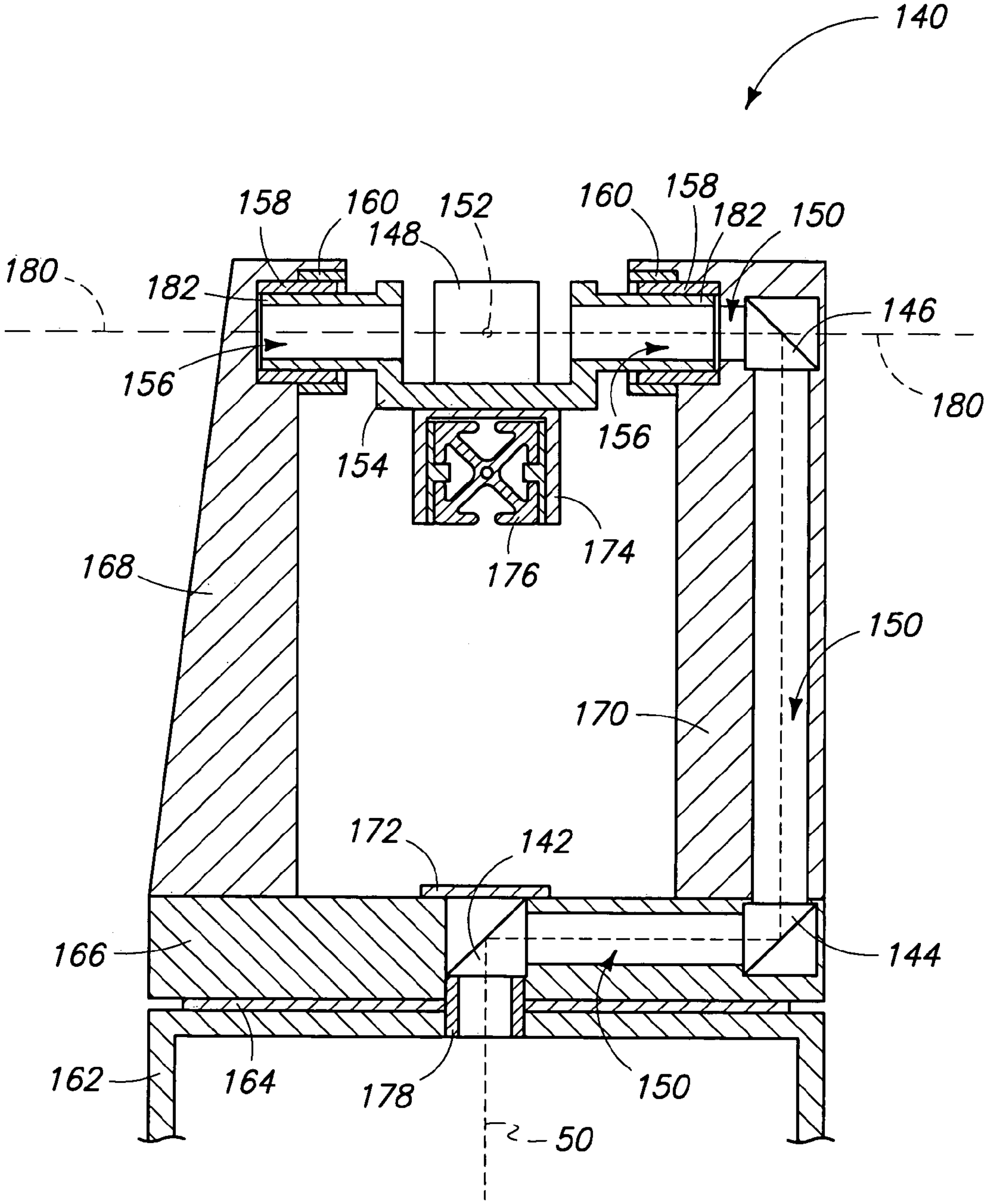
FIGS. 11-13 are respective cross-sectional, side, and top views of selected features of a laser device according to further aspect of the invention.
Figure 12:
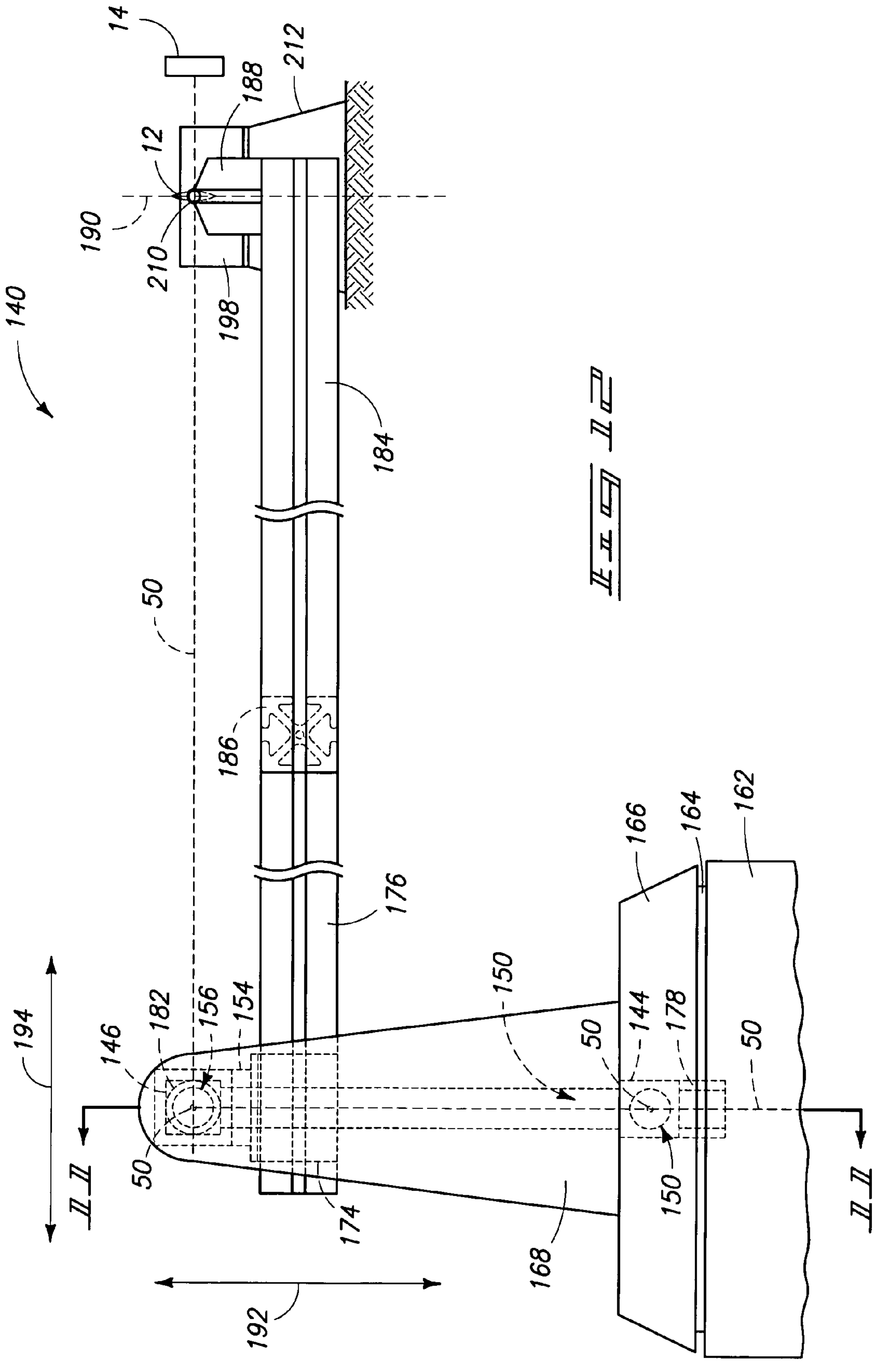
Figure 13:
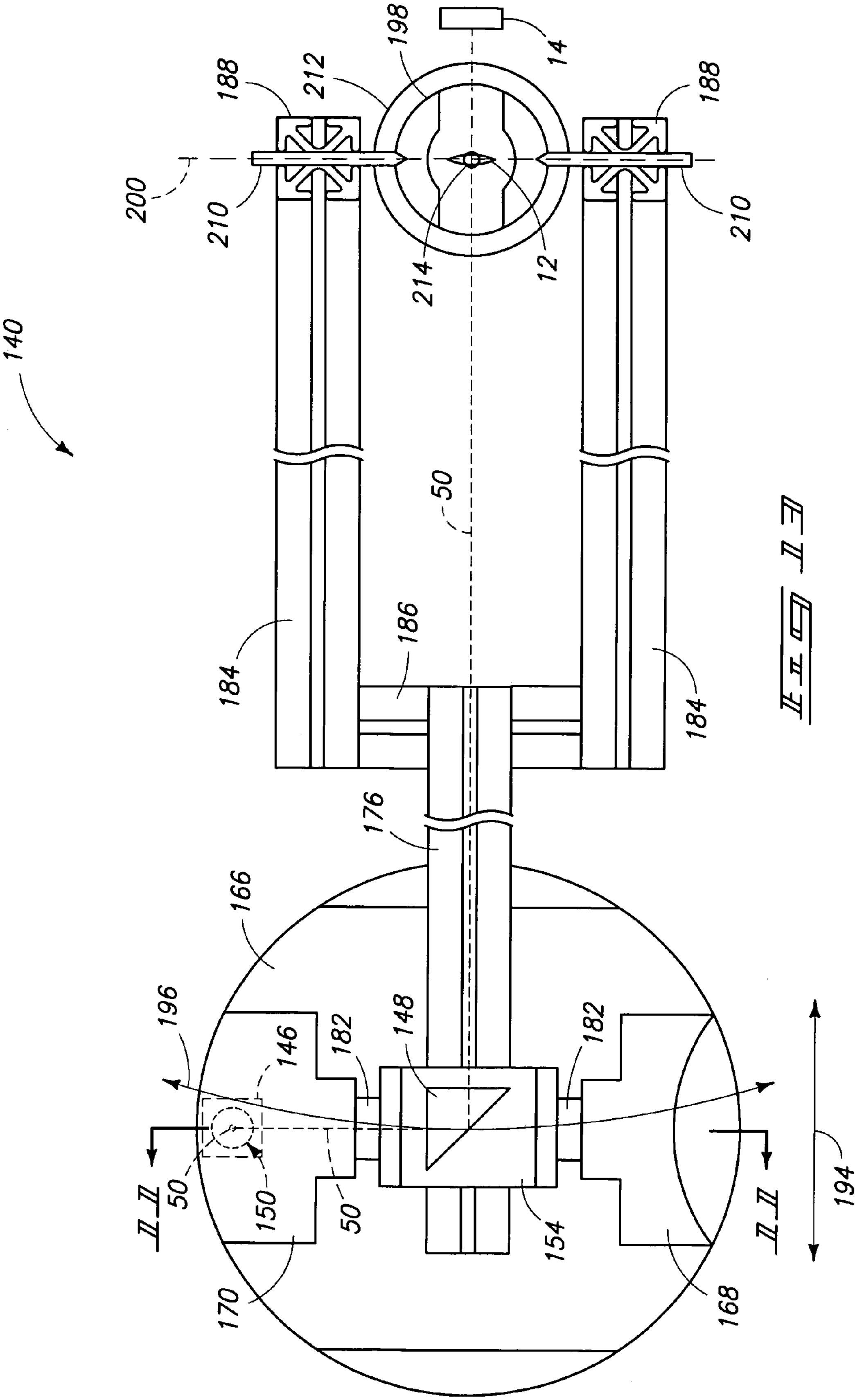
Figure 11:
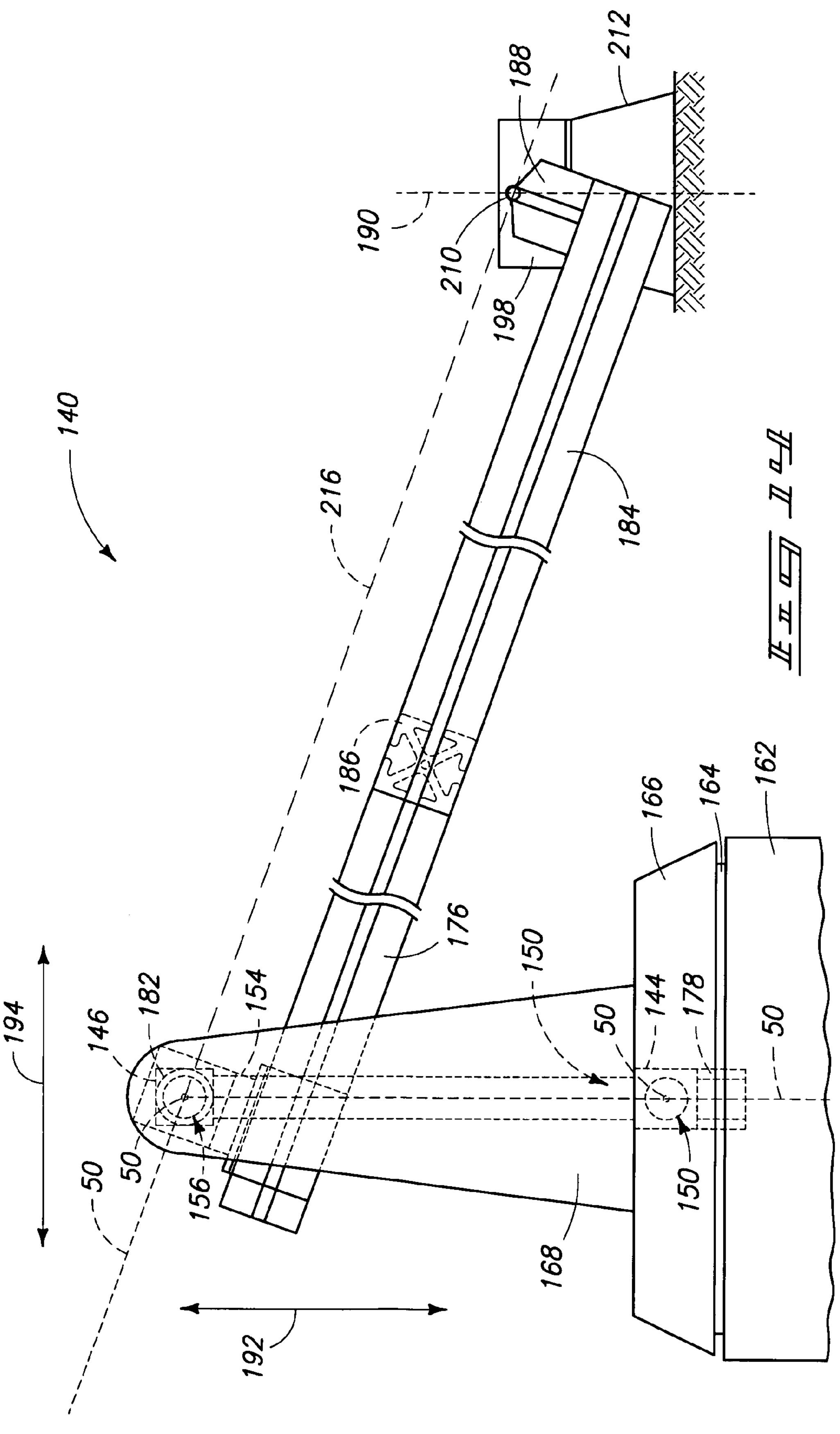

FIG. 11 shows a cross-sectional view taken along line 11-11 of FIGS. 12 and 13. Laser device 140 in FIG. 11 includes a virtual source configured to aim laser energy that originates from a true source (not shown). Upon exiting a true laser source, laser energy 50 enters a laser passageway 150 from the bottom of FIG. 11 through an opening in a laser housing 162 wherein a bushing 178 is inserted. A prism 142 redirects laser energy 50 to a prism 144, which in turn redirects laser energy 50 to a prism 146. Laser energy 50 exiting prism 146 then leaves laser passageway 150 and enters a laser passageway 156 of a swing 154 en route to an exit prism 148. Laser energy 50 leaves exit prism 148 from a laser exit 152 and travels coincident with an orientation line (not shown in FIG. 11) determined by the virtual source and virtual source manipulation mechanism that form a part of laser device 140.

Sleeves 182 of swing 154 through which laser passageway 156 extends are received within vertical bearings 158, in turn received within respective posts 168 and 170. Retainers 160 couple together the assembly of vertical bearings 158, sleeves 182, and posts 168 and 170. Accordingly, swing 154 has a vertical rotational axis 180 during vertical motion of the virtual source. Posts 168 and 170 are formed on a base 166 joined with laser housing 162 by bushing 178. A bearing pad 164 formed from, for example, polytetrafluoroethylene (PTFE), separates base 166 from housing 162. Accordingly, bearings (not shown) may be provided in a conventional manner to support the weight of base 166 on housing 162 and, if desired, to allow easy rotation of base 166 and/or housing 162 about bushing 178. A cover 172 allows access to prism 142 within laser passageway 150 for insertion, removal, and cleaning. Similar covers, although not shown, may provide access to prisms 144 and 146. A rail 176 is linked to swing 154 with a low-friction slide 174 attached to swing 154 below exit prism 148. Rail 176 forms another part of a manipulation mechanism shown in FIGS. 12 and 13.

FIG. 12 is a side view and FIG. 13 is a top view of the laser device shown in FIG. 11. Laser energy 50 departing exit prism 148 is collinear with an orientation line through an index origin at the intersection of a center of lateral pivot 190 and a center of vertical pivot 200. Center of lateral pivot 190 is collinear with a lateral index of a lens 12 and center of vertical pivot 200 is collinear with a vertical index of lens 12. The intersection of the lateral index and vertical index at an index origin coincide with the center of lens 12. Laser energy 50 passes through lens 12 to a target position 14. Given the coincidence of pivots 190 and 200 with respective indices of lens 12, vertical motion 192 of the virtual source produces a related, predictable vertical displacement of laser energy 50 at target position 14 as directed through lens 12. Similarly, lateral motion 196 of the virtual source produces a related, predictable lateral displacement of laser energy 50 at target position 14 as directed through lens 12.

As is apparent from FIG. 13, lateral motion 196 of the virtual source occurs curvilinearly instead of linearly, as shown for virtual source 68 in FIG. 7. The curvilinear lateral motion 196 occurs using a swivel table 198 on a base 212 rotating about center of later pivot 190, swivel table 198 being physically linked to swing 154 by rails 176, 186, 188, and 184 attached to swivel table 198 with axles 210. Lens 12 is supported over swivel table 198 with a conventional lens mount 214. Accordingly, lens 12 may rotate along with swivel table 198 about center of lateral pivot 190. Alternatively, for a short range of lateral motion 196, lens 12 may be fixed instead of rotating with swivel table 198 and laser energy 50 may still extend through the index origin. If lateral motion 196 extends too far, then laser energy 50 may pass through the index origin of lens 12 without effectively reaching target position 14. Laser housing 162 may be placed upon a curvilinear track or appropriately oriented wheels to facilitate curvilinear lateral motion 196. It is also conceivable that the virtual source may move radially according to radial motion 194 along rail 176.

Laser energy in FIGS. 11-13 may be considered to be aimed convergently, passing through the index origin. However, rotation of exit prism 148 about vertical axis 180 by 180° reorients laser energy 50 to extend radially outward from laser device 140, as shown in FIG. 15. Notably, laser energy 50 extends along an orientation line 216 in a manner which may be termed "divergent." Even though divergent aiming is not expressly shown for the laser devices of FIGS. 1-7, such devices may also be used for divergent aiming. For example, prism 58 of virtual source 68 shown in FIG. 5 may be rotated 180° about vertical axis 62 or lateral axis 64 to change the direction of laser energy 50 by 180° in a divergent manner.

In the possible uses for a divergently aimed laser device, a significant range of motion may be desirable. The vertical and lateral motion shown in FIGS. 6 and 7 being linear may limit the range of motion significantly. By comparison, laser housing 162 in FIG. 15 conceivably moves 360° around center of lateral pivot 190. Also, vertical motion 192 may be combined with radial motion 194 to hypothetically allow a 360° range of motion about center of vertical pivot 200.

FIG. 14 shows swing 154 raised with respect to center of lateral pivot 200, changing the orientation of laser energy 50 so as to remain coincident with orientation line 216. Swing 154 is physically linked to the lateral index coincident with center of vertical pivot 200. Accordingly, raising swing 154 causes it to tilt, accommodating the physical link and likewise tilting exit prism 148 to reorient laser energy 50. Although swing 154 could be raised only vertically to a very high position to increasingly raise the orientation of laser energy 50, swing 154 may move radially inward toward swivel table 198 to likewise increasingly raise the orientation of laser energy 50 without raising swing 154 any higher than shown in FIG. 14. Practically speaking, a full 360° range of motion would be difficult given the mechanical limitations in laser device 140 shown in FIGS. 11-15. However, a much greater range of motion may be obtained in comparison to the laser devices shown in FIGS. 1, 6, and 7. A full 360° range of motion about both center of lateral pivot 190 and center of vertical pivot 200 traverses 4□ steradians of solid angle (i.e. spherical). Even with the mechanical limitations, a laser device such as shown in FIGS. 11-15 may traverse more than 3□steradians of solid angle and, thus, be referred to as a 3□plus beam control system and have a diverse number of uses. Combination of two 3□plus laser devices, such as shown in FIGS. 11-16, could provide nearly 4□steradian coverage (i.e., 4□minus).

FIG. 16 shows a schematic of laser device 140 further including sensors 224 to allow both aiming and receiving of laser energy. True source 92 provides laser energy 50 to a beam splitter 218. Laser energy 50 exiting beam splitter 218 enters either a virtual source 220 or a beam stop 228, which blocks energy reflections. Laser energy 50 passing through virtual source 220 is aimed along an orientation line defined by vertical angle □ and lateral angle R. Laser energy 222 may be received into virtual source 220 along the orientation line, passing through beam splitter 218 so as to provide received laser energy 222 to various mirrors 226 and sensors 224 for analysis and processing.

Essentially, laser energy 50 emanating from virtual source 220 functions as a steering beam for properly orienting virtual source 220 to a position where it may receive a collinear transfer of laser energy 222. One potential use of the sensor mechanism included in laser device 140 of FIG. 16 includes atmospheric interrogation for chemicals. Emanating laser energy 50 may excite certain molecules, depending upon laser wavelength or other electromagnetic characteristics, which then release energy that may be received by virtual source 220. Given the wavelength independence discussed herein, multiple different wavelengths of laser energy could be included in laser energy 50 to identify different chemicals. Accordingly, a variety of emission sources may be detected. Such composite laser energy may be obtained by designing a particular single beam using conventional beam processing techniques or by combining multiple beams into a single collinear transmission of laser energy 50.

In a similar fashion, emanating laser energy 50 may address a distant, inactive device that then initiates some type of analysis and replies in a collinear signal to virtual source 220. Such an analytical device might not be powered by any source other than laser energy 50. Some type of a chemical sensor is a possible device and would be difficult to locate by those not aware of its physical position since it emits no electromagnetic radiation except for the intermittent interrogation with laser energy 50 addressing the otherwise inactive device. The various uses discussed herein may be compatible with both pulsed as well as continuous wave lasers.

In a further aspect of the invention, a laser device such as one of those described herein can include a target position within a high magnetic field and a damping device operating under Lenz' Law to reduce vibration of the target position. For the device in FIGS. 6-7, vacuum system 72 can include vacuum pumps that generate vibrations transmitted through vacuum system 72 to probe bar 132 and cell supports of detection cells 74. Such vibrations can impede aligning the same spot twice on a target with laser energy even when no manipulation of the laser source occurs. Magnet 70 can be a superconducting magnet providing a large magnetic field of potential advantageous use in damping the described vibrations.

Lenz' Law states that a magnetic flux can be induced in a conducting loop inside a magnetic field. If a force, such as physical movement of the conducting loop, causes a change in the induced magnetic flux, an electromotive force current will be induced such that its magnetic field will oppose the change. Accordingly, fabricating at least some components of the cell supports and/or probe bar 132 from a non-ferromagnetic, high conductivity material, such as aluminum and/or copper, can dampen vibrations within magnet 70. Aluminum and oxygen free high conductivity (OFHC) copper can be used instead of typical non-ferromagnetic materials such as titanium or 314 or 316 stainless steel. Aluminum and OFHC copper are non-ferromagnetic, but exhibit electrical conductivities sufficient to take advantage of the effect known as magnetic damping depending upon Lenz' Law. Other materials may be suitably used instead of or in combination with aluminum and/or OFHC copper, including non-ferromagnetic materials exhibiting high enough electrical conductivity suitable for a desired application. Accordingly, vibrations from pumps associated with vacuum system 72 that are conveyed through the cells, cell supports, and/or probe bar can be damped as a result of the opposing torque generated in magnet 70.

Cell supports for detection cells 74 can be suspended from the housing of vacuum system 72 on rods attached to vacuum system 72 with articulating joints. Such joints provide support for the cell and additionally exhibit sufficient degrees of freedom to allow detection cells 74 to stabilize within the magnetic field independent of vacuum system 72. Care may be taken in judging the amount of high conductivity non-ferromagnetic material to be placed in the magnetic field since the time and mechanical force used to insert, relocate, and retrieve the assembly (cell, cell supports, probe bar and supports) from the magnetic field may exceed the operator's and/or designing engineer's desired parameters. This is especially true for superconducting magnets whose structure contains critical welds that should not be subjected to excessive force to avoid permanent damage to the magnet. Adjustments to the induced field can be made by altering physical dimensions of parts and adding slits or removing unneeded portions of parts to mediate the induced current. For example, an aluminum support ring might be used to secure a stainless steel probe bar, wherein the support ring provides the damping effect.

Accordingly, the laser device according to the present aspect of the invention can be comprised by a laser desorption spectrometer and the damping device can contain a probe bar including the target position and cell supports of at least one desorbed energy detection cell. The probe bar and cell supports can be subject to Lenz' Law. The high magnetic field can be greater than about 50 gauss to effectively utilize Lenz' Law, or preferably greater than about 1 Tesla. However, a different magnetic field may be suitable depending on the application. The suitable magnetic field can be determined by Newton's second law stating that Force=Mass×Acceleration. That is, the suitable magnetic field depends on the force induced thereby, the mass of the object being damped, and the displacement and frequency caused by vibrations (acceleration). Accordingly, the dimensions (and hence mass) and electrical conductivity of cells, cell supports, and/or probe bar can affect damping as well the particular vibration source. A different magnetic field may be used to induce the force desired under the various possible conditions to operate as an effective damping device.

EXAMPLE

An internal source laser desorption microprobe Fourier transform mass spectrometer (LD-FTMS) was developed using twelve design goals: 1) movement of laser energy relative to a sample rather than sample manipulation to avoid problems with a high magnetic field and superconducting magnet geometry, 2) variable step intervals for laser energy resolution of at least about 0.5 μm, 3) highly reproducible laser energy positioning to enable successive analyses for depth-profiling studies, 4) absolute laser positioning to within 0.1 μm or less, 5) wavelength independent scanning system, 6) automated focusing to adjust for different energy wavelengths, 7) variable laser spot size down to at least about 2 μm with a single focusing lens that can be easily exchanged for different spot sizes, 8) external optics for simple laser energy alignment, 9) circular laser spots, 10) Gaussian laser energy profile and uniform energy deposition, 11) sample sizes up to about 2 centimeters (cm) in diameter, and 12) modular cells and cell supports allowing multiple cell configurations.

FIGS. 6 and 7 show selected features of a LD-FTMS developed according to the described goals. Selected parts of the LD-FTMS cells, cell supports, probe bar, and/or probe bar supports were manufactured from aluminum and OFHC copper instead of typical titanium or 316 stainless steel to take advantage of magnetic damping depending upon Lenz' Law. Because typical LD-FTMS technology uses titanium or 316 stainless steel that is not affected by magnetic fields, some concern existed that the use of aluminum and copper instead might adversely affect the magnetic field of magnet 70. Homogeneity of the magnetic field could not be mapped with probe bar 132 and detection cells 74 installed, however, no adverse effects were observed during calibrations, analyses, etc.

A Nd:YAG laser model Surelite I-10 from Continuum of Santa Clara, Calif. was provided as true laser source 92 and included a separations package 94. A grating tuned dye laser head model Jaguar C from Continuum was provided as dye laser head 96. Settings of variable beam splitter 82, beam expander 80, and iris 78 were selected to provide a typical laser energy at target position 14 of about 2 microjoules, giving a laser fluence of $4\times10^8$ Watts/cm for a 10 μm spot. Lens 12 was located external to vacuum system 72 allowing easy exchange of lenses and adjustment of focal length. Focal length was adjusted by remote control of a stepper motor powered by a microstepping controller in turn driving a vacuum actuator at 40 turns per inch. The vacuum actuator was linked to a lens mount carriage that housed lens 12 with a 5 foot fiberglass rod, thus positioning the stepper motor distantly and outside the 50 Gauss line of magnet 70.

A manipulation mechanism similar to gimbal system 100 of FIG. 3 was manufactured from aluminum rail from 80/20 Inc. of Columbia City, Ind. The aluminum rail geometry provided torsional rigidity and was self-damping for low mode vibrations. The lateral and vertical indices of lens 12 were aligned to coincide with the approximate centers of lateral and vertical pivot for gimbal system 100. Lateral and vertical indices of lens 12 intersected at the center of lens 12 and provided auto alignment to lens 12 center. A virtual source similar to virtual source 68 shown in FIG. 5 was linked to optical bench 118 of gimbal system 100 with a low friction slide attached to swing 120 below prism 58. The distance between virtual source 68 and the lens 12 center was maintained to at least about 1.3 meters (4 feet) which is outside the 50 Gauss line of magnet 70. A maximum distance of about 4.6 meters (15 feet) was used due to laboratory constraints, but could be greater.

At a desorption power level of 7 Joules/pulse with a beam diameter of 8 mm to the final focusing lens, rapid deterioration of common mirror materials made them impractical, whether standard or front-surface types. Standard mirrors also suffered from refractive effects violating the wavelength independence requirement. For these reasons, virtual source 68 only utilized prisms to direct the laser beam. The beam incidence and exidence was always normal for each element providing true wavelength independence.

A lateral drive for virtual source 68 was used to provide 5 μm steps at virtual source 68 with a pitch of 2 turns per inch. A vertical drive was used to provide 1 μm steps at virtual source 68 with a pitch of 40 turns per inch.

A first lens was used having a focal length of 80 millimeters (mm) positioned accordingly from target position 14 and the virtual source was positioned 272 cm from the first lens. The virtual source was thus located about 201 cm from the edge of magnet 70. The ratio of distance J to distance H was about 0.029 providing a spatial resolution at target position 14 of about 0.15 μm laterally and about 0.03 μm vertically. The smallest spot size obtainable was about 2 μm. The focal length of the first lens limited excursion of laser energy across target position 14 to about 1.25 cm laterally and vertically, which is less than the desired about 2 cm traverse.

A second lens was used having a focal length of 325 mm and the virtual source was located 247.5 cm from the second lens. The ratio of distance J to distance H was thus about 0.13 providing a spatial resolution at target position 14 of 0.66 μm laterally and 0.13 μm vertically. Although the lateral resolution was less than the desired 0.5 μm, lateral resolution could be increased by replacing the lateral drive with a device providing a finer pitch. The smallest practical laser spot size was about 4 μm and the laser energy at target position 14 could traverse about 5.1 cm along either index. Providing lens 12 external to vacuum system 72 allowed easy exchange of multi-element optics to produce smaller spot sizes if desired.

Figure 8:
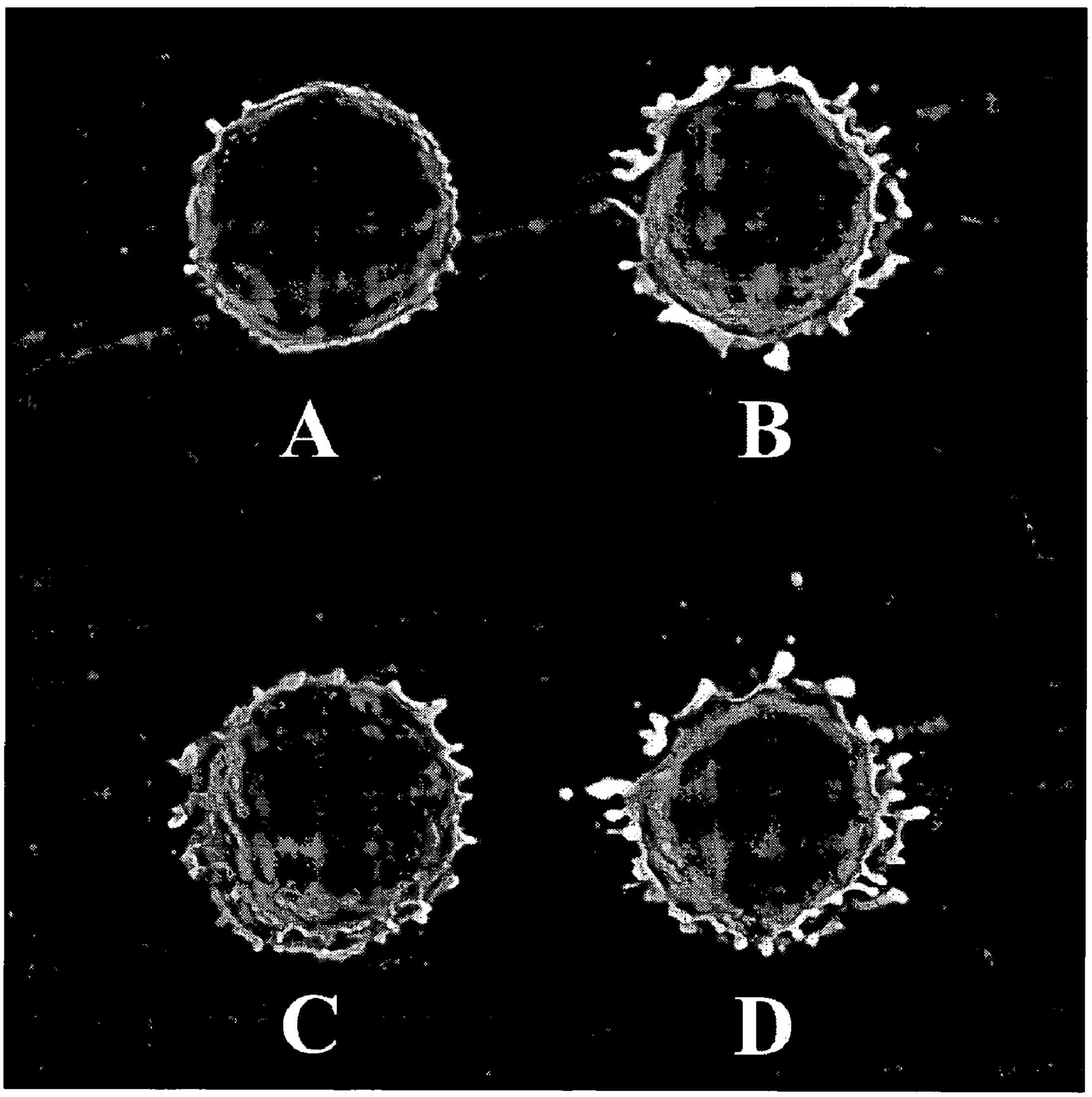
FIG. 8 is a scanning electron microscope image of an aluminum foil target processed in the laser device of FIGS. 6-7.

FIG. 8 shows a scanning electron micrograph (SEM) of an aluminum foil target with 4 laser shots from the corner of a larger array of 36×36 laser shots illustrating the quality and reproducibility. The original 36×36 array was made with single laser shots having an approximate diameter of 14 μm. The scanning feature of LD-FTMS was used to return to perimeter positions of the array and apply a second laser shot. Position A in FIG. 8 is a single laser shot from the array interior and illustrates the circular shape of laser shots provided as the laser energy passes through the center of lens 12, rather than through another part of lens 12. The consistent circular shape regardless of spot position is advantageous in spectral analysis, simplifying calculations in comparison to systems producing ellipsoidal spots when laser energy is aimed off the center of lens 12. Positions B, C, and D are double shots formed by returning to the shown positions after completing the array of single shots and illustrate the high level of reproducibility.

Figure 9:
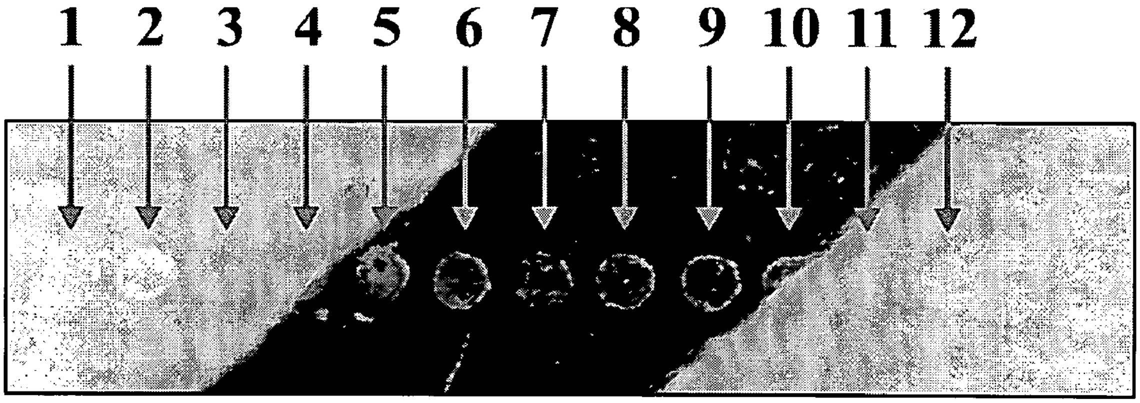
FIG. 9 is a scanning electron microscope image of a printed circuit board analyzed in the laser device of FIGS. 6-7.
Figure 10:
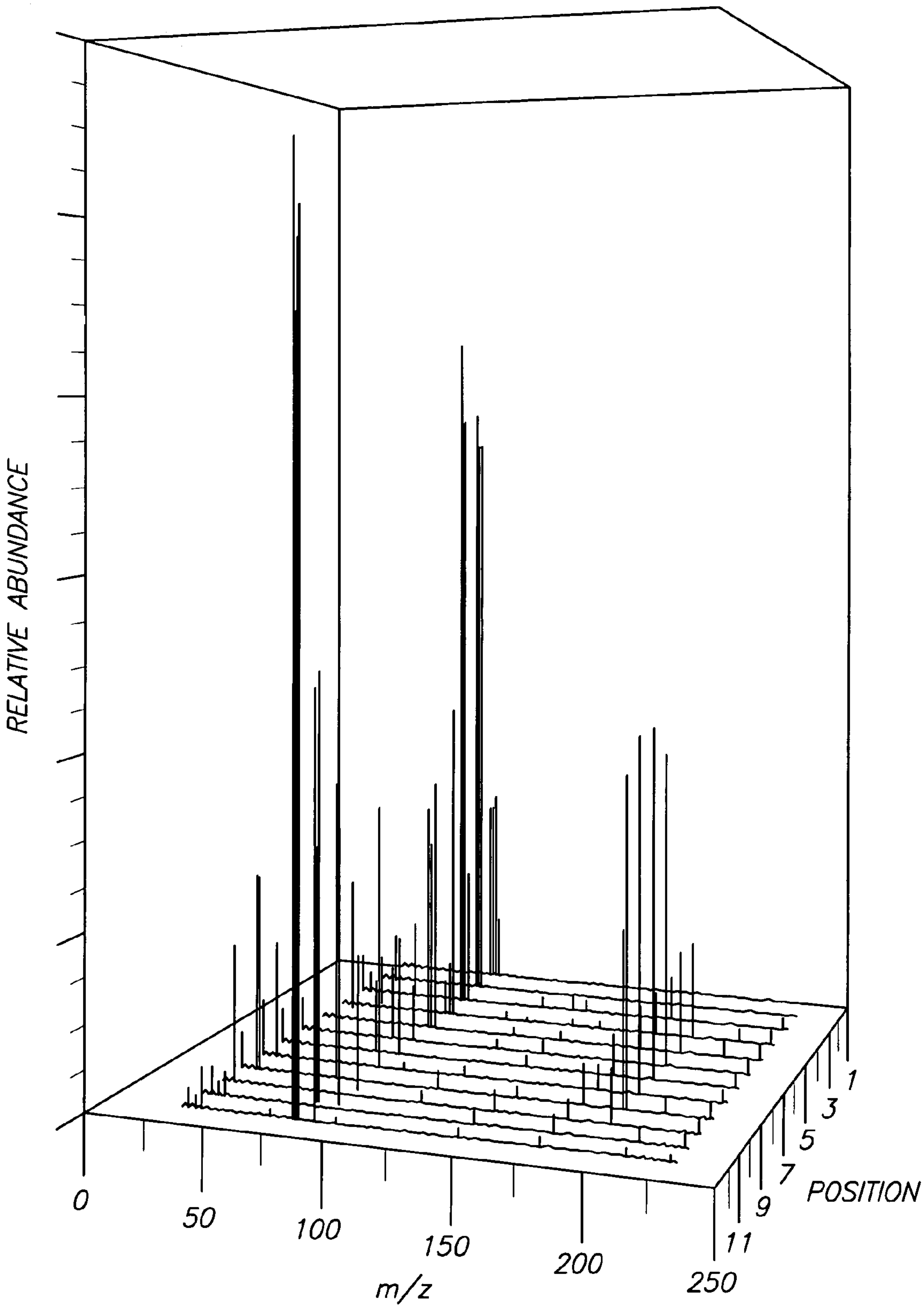
FIG. 10 is a chart displaying spectral results from analyzing the printed circuit board of FIG. 9.

FIG. 9 shows a printed circuit board analyzed using the described LD-FTMS. The SEM in FIG. 9 shows 12 laser spots having diameters of approximately 20 μm. The laser spots occur both on the phenolic portion of the composite board as well as across a gold trace having a width of about 115 μm. The arrows were added to identify the location of laser spots on the phenolic board since they are less distinct than laser spots on the gold trace. The mass spectra array from the laser spots is shown in FIG. 10. Spectra from spots on the phenolic board were dominated by the isotope peaks for chlorine ion (Cl □) (m/z 34.969 and 36.966) and bromine ion (Br □) (m/z 78.919 and 80.917). Spectra for positions 5-9 clearly show a peak at m/z 196.967 representing gold ion (Au □). The laser spots at positions 4 and 10 are on the edges of the gold trace and exhibit a mixture of peaks from gold, chlorine, and bromine.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A laser device comprising:

a virtual laser energy source configured to aim laser energy that originates from a true laser energy source, the virtual source having a vertical rotational axis during vertical motion of the virtual source, the vertical axis passing through an exit point from which the laser energy will emanate independent of virtual source position, the emanating laser energy being collinear with an orientation line; and a virtual source manipulation mechanism that positions the virtual source, the manipulation mechanism having a center of lateral pivot approximately coincident with a lateral index and a center of vertical pivot approximately coincident with a vertical index, the vertical index and lateral index intersecting at an index origin, the virtual source and manipulation mechanism auto aligning the orientation line through the index origin during virtual source motion.

2. The device of claim 1 further comprising a true laser energy source providing laser energy into the virtual source.

3. The device of claim 1 wherein lateral virtual source motion is physically linked to the lateral index.

4. The device of claim 1 wherein vertical virtual source motion is physically linked to the vertical index.

5. The device of claim 1 wherein virtual source vertical motion occurs linearly.

6. The device of claim 1 wherein virtual source lateral motion occurs linearly.

7. The device of claim 1 wherein virtual source lateral motion occurs curvilinearly.

8. The device of claim 1 wherein the manipulation mechanism also positions the virtual source radially with respect to the index origin.

9. The device of claim 1 wherein the virtual source is wavelength independent.

10. The device of claim 1 further comprising at least one dynamically positioned prism that maintains the laser energy from a true laser energy source through the virtual source during the virtual source positioning.

11. The device of claim 10 comprising at least three dynamically positioned prisms.

12. The device of claim 1 wherein the virtual source vertical axis is formed by a swing between two posts or nested within a first box, the laser energy emanating from a prism rotating with and mounted on the swing.

13. The device of claim 1 wherein the virtual source further comprises a lateral rotational axis during lateral motion of the virtual source, the lateral axis and vertical axis intersecting at an axes origin coincident with the exit point.

14. The device of claim 13 wherein the virtual source lateral axis is formed by a first box nested within a second box and rotating therein, the laser energy emanating from a prism rotating with the first box.

15. The device of claim 1 wherein virtual source vertical motion is accomplished by a second box nested within a third box, the second box moving vertically and approximately linearly within the third box.

16. The device of claim 1 wherein the laser energy is aimed convergently, passing through the index origin.

17. The device of claim 16 further comprising:

a target position;

an optical component separated from the target position, the lateral index and vertical index being defined for the optical component and the center of the optical component coinciding with the index origin.

18. The device of claim 17 wherein the optical component comprises a lens.

19. The device of claim 1 wherein the laser energy is aimed divergently, extending radially outward along the orientation line.

20. The device of claim 19 further comprising sensors, wherein the virtual source is further configured to receive external laser energy along the orientation line and to direct it to the sensors.

21. The device of claim 1 further comprising at least one desorbed energy detection cell, the laser device being comprised by a laser desorption spectrometer.

22. A laser device comprising:

a true laser energy source;

a wavelength independent, virtual laser energy source configured to aim laser energy that originates from the true source, the virtual source having a vertical rotational axis during vertical motion of the virtual source and a lateral rotational axis during lateral motion of the virtual source, vertical and lateral motion of the virtual source both occurring linearly, the lateral axis and vertical axis intersecting at an axes origin coincident with an exit point from which the laser energy will emanate independent of virtual source position, the emanating laser energy being collinear with an orientation line;

at least three dynamically positioned prisms in the virtual source that maintain the laser energy from the true source through the virtual source during virtual source positioning; and a virtual source manipulation mechanism that positions the virtual source, the manipulation mechanism having a center of lateral pivot approximately coincident with a lateral index and a center of vertical pivot approximately coincident with a vertical index, the vertical index and lateral index intersecting at an index origin, lateral virtual source motion being physically linked to the lateral index and vertical virtual source motion being physically linked to the vertical index, the virtual source and manipulation mechanism auto aligning the orientation line through the index origin during virtual source motion.

23. The device of claim 22 wherein the laser energy is aimed convergently, passing through the index origin.

24. The device of claim 22 wherein the laser energy is aimed divergently, extending radially outward along the orientation line.

25. A laser device comprising:

a true laser energy source;

a wavelength independent, virtual laser energy source configured to aim laser energy that originates from the true source, the virtual source having a vertical rotational axis during vertical motion of the virtual source, vertical motion of the virtual source occurring linearly and lateral motion of the virtual source occurring curvilinearly, the vertical axis passing through an exit point from which the laser energy will emanate independent of virtual source position, the emanating laser energy being collinear with an orientation line;

at least three prisms in the virtual source that maintain the laser energy from the true source through the virtual source, at least one of the prisms being dynamically positioned during virtual source positioning; and a virtual source manipulation mechanism that positions the virtual source, the manipulation mechanism having a center of lateral pivot approximately coincident with a lateral index and a center of vertical pivot approximately coincident with a vertical index, the vertical index and lateral index intersecting at an index origin, lateral virtual source motion being physically linked to the lateral index and vertical virtual source motion being physically linked to the vertical index, the manipulation mechanism also positioning the virtual source radially with respect to the index origin, the virtual source and manipulation mechanism auto aligning the orientation line through the index origin during virtual source motion.

26. The device of claim 1 wherein the laser energy is aimed convergently, passing through the index origin.

27. The device of claim 1 wherein the laser energy is aimed divergently, extending radially outward along the orientation line.

* * * * *